(12) United States Patent
Horiuchi et al.

(10) Patent No.: US 12,021,764 B2
(45) Date of Patent: *Jun. 25, 2024

(54) SYSTEM AND METHOD FOR CONTROLLING TRANSMISSION OF DOWNLINK CONTROL INFORMATION

(71) Applicant: Sun Patent Trust, New York, NY (US)

(72) Inventors: Ayako Horiuchi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/335,770

(22) Filed: Jun. 1, 2021

(65) Prior Publication Data

US 2021/0288766 A1  Sep. 16, 2021

Related U.S. Application Data

(63) Continuation of application No. 16/693,816, filed on Nov. 25, 2019, now Pat. No. 11,057,168, which is a
(Continued)

(30) Foreign Application Priority Data

May 9, 2012 (JP) .................................. 2012-107677

(51) Int. Cl.
*H04L 5/00* (2006.01)
*H04W 72/1273* (2023.01)
*H04W 72/23* (2023.01)

(52) U.S. Cl.
CPC ............ *H04L 5/001* (2013.01); *H04L 5/0048* (2013.01); *H04W 72/1273* (2013.01);
(Continued)

(58) Field of Classification Search
CPC ....... H04L 5/001; H04L 5/0048; H04L 5/005; H04L 5/0053; H04W 72/23; H04W 72/1273
See application file for complete search history.

(56) References Cited

U.S. PATENT DOCUMENTS 7,020,482 B2   3/2006 Medvedev et al.
9,438,400 B2 * 9/2016 Horiuchi ............... H04L 5/0048
(Continued)

FOREIGN PATENT DOCUMENTS

JP   2011-238983 A   11/2011
JP   2012-5074 A    1/2012
(Continued)

OTHER PUBLICATIONS

3GPP TS 36.216 V10.1.0, "3rd Generation Partnership Project; Technical Specification Group Radio Access Network; Evolved Universal Terrestrial Radio Access (E-UTRA); Physical layer for relaying operation (Release 10)," Dec. 2010, 15 pages.
(Continued)

*Primary Examiner* — Mandish K Randhawa
(74) *Attorney, Agent, or Firm* — Seed IP Law Group LLP

(57) ABSTRACT

Disclosed is a transmission apparatus capable of properly performing cross carrier scheduling in ePDCCHs. In this apparatus, when communication is performed using a plurality of component carriers (CCs), configuration section 102 configures a first search space as a candidate to which control information for a first CC is assigned and a second search space as a candidate to which control information for a second CC other than the first CC among the plurality of CCs is assigned, within a same allocation unit group among a plurality of allocation unit groups included in a data-assignable region within the first CC, and transmission section 106 transmits control information mapped to the first
(Continued)

search space and control information mapped to the second search space.

12 Claims, 15 Drawing Sheets

Related U.S. Application Data continuation of application No. 16/397,216, filed on Apr. 29, 2019, now Pat. No. 10,523,381, which is a continuation of application No. 15/895,857, filed on Feb. 13, 2018, now Pat. No. 10,326,567, which is a continuation of application No. 15/478,059, filed on Apr. 3, 2017, now Pat. No. 9,929,836, which is a continuation of application No. 15/222,814, filed on Jul. 28, 2016, now Pat. No. 9,647,813, which is a continuation of application No. 14/125,553, filed as application No. PCT/JP2013/002799 on Apr. 25, 2013, now Pat. No. 9,438,400.

(52) U.S. Cl.
CPC ............ *H04W 72/23* (2023.01); *H04L 5/005* (2013.01); *H04L 5/0053* (2013.01)

(56) References Cited

U.S. PATENT DOCUMENTS

| | | | | |
|---|---|---|---|---|
| 9,647,813 B2* | 5/2017 | Horiuchi | ............... | H04W 72/23 |
| 9,929,836 B2* | 3/2018 | Horiuchi | ............... | H04L 5/0048 |
| 10,326,567 B2* | 6/2019 | Horiuchi | ............... | H04L 5/0048 |
| 10,523,381 B2* | 12/2019 | Horiuchi | ............... | H04W 72/23 |
| 11,057,168 B2* | 7/2021 | Horiuchi | ............... | H04W 72/23 |
| 2005/0180353 A1 | 8/2005 | Hansen et al. | | |
| 2011/0076962 A1 | 3/2011 | Chen et al. | | |
| 2011/0274066 A1 | 11/2011 | Tee et al. | | |
| 2011/0319113 A1 | 12/2011 | Takeda et al. | | |
| 2012/0044921 A1 | 2/2012 | Chung et al. | | |
| 2012/0087318 A1 | 4/2012 | Liu et al. | | |
| 2013/0058240 A1 | 3/2013 | Kim et al. | | |
| 2013/0058286 A1 | 3/2013 | Takeda et al. | | |
| 2013/0107836 A1 | 5/2013 | Miki et al. | | |
| 2013/0142142 A1* | 6/2013 | McBeath | ............... | H04W 72/23 370/329 |
| 2013/0329686 A1 | 12/2013 | Kim et al. | | |
| 2014/0050192 A1 | 2/2014 | Kim et al. | | |
| 2014/0126485 A1 | 5/2014 | Chen et al. | | |
| 2014/0301286 A1* | 10/2014 | Abe | ............... | H04W 48/12 370/329 |

FOREIGN PATENT DOCUMENTS

| | | |
|---|---|---|
| KR | 10-2011-0084976 A | 7/2011 |
| KR | 10-2011-0112789 A | 10/2011 |
| KR | 10-2012-0004470 A | 1/2012 |
| WO | 2011/083986 A2 | 7/2011 |

OTHER PUBLICATIONS

ETSI TS 136 213 V10.4.0, "LTE; Evolved Universal Terrestrial Radio Access (E-UTRA); Physical layer procedures (3GPP TS 36.213 version 10.4.0 Release 10)," Jan. 2012, 127 pages.

Extended European Search Report dated Mar. 3, 2015, for corresponding EP Application No. 13787942.5-1851 / 2816855, 6 pages.

HTC, "CIF Content Mapping," R1-103609, 3GPP TSG-RAN WG1 #61bis, Agenda Item: 6.2.3.2, Dresden, Germany, Jun. 28-Jul. 2, 2010, 3 pages.

International Search Report, dated Jul. 2, 2013, for International Application No. PCT/JP2013/002799, 2 pages (with English translation).

Indian Office Action, dated Sep. 30, 2019, for Indian Application No. 2344/MUMNP/2013, 7 pages.

Mitsubishi Electric, "On e-DPCCH mapping," Tdoc R1-121722, 3GPP TSG RAN WG1 #68bis, Agenda Item: 7.6.3, Jeju, Korea,, Mar. 26-30, 2012, 2 pages.

NEC Group, "Search space design for E-PDCCH," R1-120256, 3GPP TSG RAN WG1 Meeting #68, Agenda Item: 7.6.3, Dresden, Germany, Feb. 6-10, 2012, 6 pages.

Research In Motion, UK Limited, "Support Common Control Channel in E-PDCCH," R1-121479, 3GPP TSG RAN WG1 Meeting #68bis, Agenda Item: 7.6.2, Jeju, Korea, Mar. 26-30, 2012, 5 pages.

\* cited by examiner

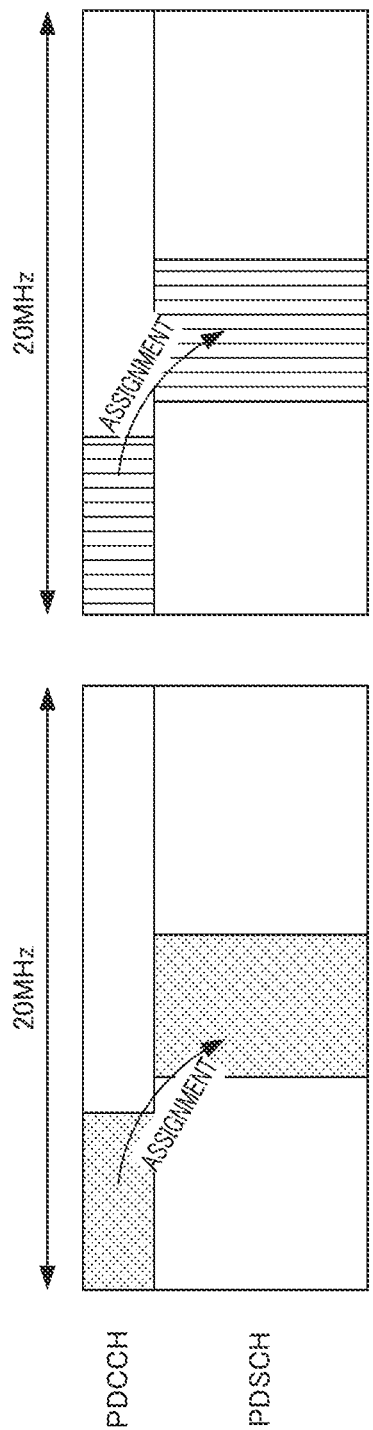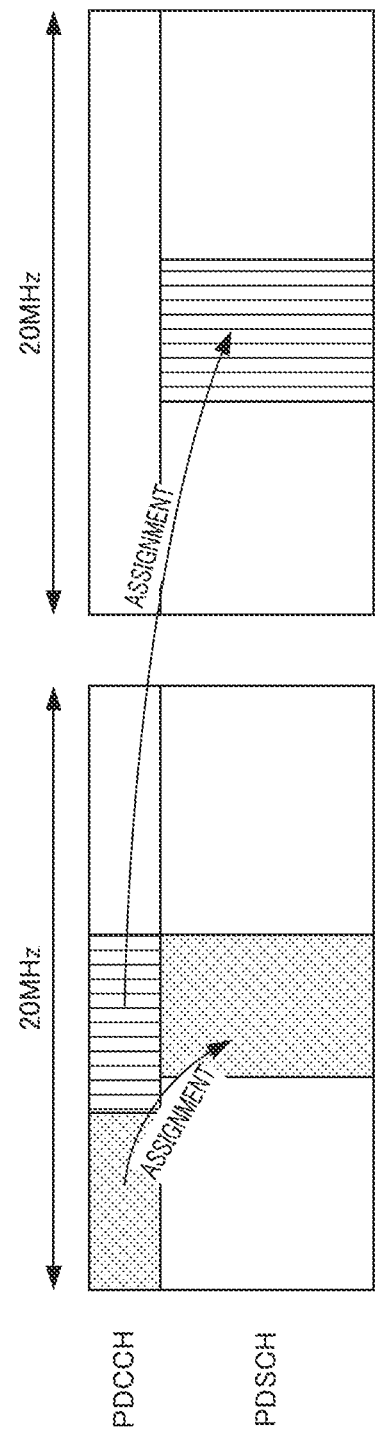

SYSTEM AND METHOD FOR CONTROLLING TRANSMISSION OF DOWNLINK CONTROL INFORMATION

BACKGROUND

Technical Field

The present disclosure relates to a transmission apparatus, a reception apparatus, a transmission method, and a reception method.

Description of the Related Art

In recent years, accompanying the adoption of multimedia information in cellular mobile communication systems, it has become common to transmit not only speech data but also a large amount of data such as still image data and moving image data. Furthermore, studies have been actively conducted in LTE-Advanced (Long Term Evolution Advanced) to realize high transmission rates by utilizing broad radio bands, Multiple-Input Multiple-Output (MIMO) transmission technology, and interference control technology.

In addition, taking into consideration the introduction of various devices as radio communication terminals in M2M (machine to machine) communication and the like as well as an increase in the number of multiplexing target terminals due to MIMO transmission technology, there is a concern regarding a shortage of resources in a mapping region for PDCCH (Physical Downlink Control Channel) that is used for a control signal (that is, a "PDCCH region"). If a control signal (PDCCH) cannot be mapped due to such a resource shortage, downlink data cannot be assigned to the terminals. Therefore, even if a resource region in which downlink data is to be mapped (i.e., a "PDSCH (Physical Downlink Shared Channel) region") is available, the resource region may not be used, which causes a decrease in the system throughput.

As a method for solving such a resource shortage, a study is being made of assigning, in a data region, control signals for terminals served by a radio base station apparatus (hereunder, abbreviated as "base station"). A resource region in which control signals for terminals served by the base station are mapped is referred to as an Enhanced PDCCH (ePDCCH) region, a New-PDCCH (N-PDCCH) region, an X-PDCCH region or the like. Mapping the control signal (i.e., ePDCCH) in a data region as described above enables transmission power control on control signals transmitted to a terminal near a cell edge or interference control for interference by a control signal to another cell or interference from another cell to the cell provided by the base station.

Further, according to the LTE-Advanced system, in order to expand the coverage area of each base station, relay technology has been studied in which a radio communication relay station apparatus (hereunder, abbreviated as "relay station") is installed between a base station and radio communication terminal apparatuses (hereunder, abbreviated as "terminals"; may also be referred to as UE (user equipment)), and communication between the base station and terminals is performed via the relay station. The use of relay technology allows a terminal that cannot communicate with the base station directly to communicate with the base station via the relay station. According to the relay technology that has been introduced in the LTE-Advanced system, control signals for relay are assigned in a data region. Since it is expected that the control signals for relay may be extended for use as control signals for terminals, a resource region in which control signals for relay are mapped is also referred to as an "R-PDCCH."

In the LTE (Long Term Evolution) system, a DL grant (also referred to as "DL assignment"), which indicates a downlink (DL) data assignment, and a UL grant, which indicates an uplink (UL) data assignment are transmitted through a PDCCH. The DL grant indicates to the terminal that a resource in the subframe in which the DL grant is transmitted has been allocated to the terminal. On the other hand, the UL grant indicates to the terminal that a resource in a target subframe which is predetermined by the UL grant has been allocated to the terminal.

In the LTE-Advanced system, a region (R-PDCCH for relay station (relay PDCCH) region) in which channel control signals for relay stations are mapped is provided in the data region. Similarly to the PDCCH, a DL grant and UL grant are mapped to the R-PDCCH. In the R-PDCCH, the DL grant is mapped in the first slot and the UL grant is mapped in the second slot (refer to Non-Patent Literature "hereunder abbreviated as NPL" 1). Mapping the DL grant only in the first slot reduces a delay in decoding the DL grant, and allows relay stations to prepare for ACK/NACK transmission for DL data (transmitted in the fourth subframe following reception of the DL grant in FDD). Thus, each relay station monitors channel control signals transmitted using an R-PDCCH from a base station within a resource region indicated by higher layer signaling from the base station (i.e., a "search space") and thereby finds the channel control signal intended for the corresponding relay station.

In this case, the base station indicates the search space corresponding to the R-PDCCH to the relay station by higher layer signaling.

In the LTE and LTE-Advanced systems, one RB (resource block) has 12 subcarriers in the frequency domain and has a width of 0.5 msec in the time domain. A unit in which two RBs are combined in the time domain is referred to as an RB pair (for example, see FIG. 1). That is, an RB pair has 12 subcarriers in the frequency domain, and has a width of 1 msec in the time domain. When an RB pair represents a group of 12 subcarriers on the frequency axis, the RB pair may be referred to as simply "RB." In addition, in a physical layer, an RB pair is also referred to as a PRB pair (physical RB pair). A resource element (RE) is a unit defined by a single subcarrier and a single OFDM symbol (see FIG. 1).

Further, when the PDSCH is allocated to the RB, RBs may be allocated in units of RBs or in units of RBGs (Resource Block Group). An RBG is a unit in which a plurality of adjacent RBs are arranged. Further, the RBG size is defined by a bandwidth of a communication system, and LTE has 1, 2, 3 and 4 as the defined RBG size.

A PDCCH and R-PDCCH have four aggregation levels, i.e., levels 1, 2, 4, and 8 (for example, see NPL 1). Levels 1, 2, 4, and 8 have six, six, two, and two "mapping candidates," respectively. As used herein, the term "mapping candidate" refers to a candidate region in which a control signal is to be mapped, and a search space is formed by a plurality of mapping candidates. When a single aggregation level is configured for a single terminal, a control signal is actually mapped in one of the plurality of mapping candidates of the aggregation level. FIG. 2 illustrates an example of search spaces corresponding to an R-PDCCH. The ovals represent search spaces for the aggregation levels. The multiple mapping candidates in each search space for each aggregation level are located in a consecutive manner on VRBs (virtual resource blocks). The resource region candidates in the VRBs are mapped to PRBs (physical resource blocks) through higher layer signaling.

Studies are being conducted with respect to individually configuring search spaces corresponding to the ePDCCHs for terminals. Further, with respect to the design of the ePDCCHs, part of the design of the R-PDCCH described above can be used, and a design that is completely different from the R-PDCCH design can also be adopted. In fact, studies are also being conducted with regard to making the design of the ePDCCHs and the design of R-PDCCHs different from each other.

As described above, a DL grant is mapped to the first slot and a UL grant is mapped to the second slot in an R-PDCCH region. That is, a resource to which the DL grant is mapped and a resource to which the UL grant is mapped are divided on the time axis. In contrast, for the ePDCCHs, studies are being conducted with regard to dividing resources to which DL grants are mapped and UL grants are mapped on the frequency axis (that is, subcarriers or PRB pairs), and with regard to dividing REs within an RB pair into a plurality of groups.

Further, the LTE-Advanced system supports carrier aggregation (CA). CA is a new function introduced in the LTE-Advanced system, which bundles a plurality of system bands termed component carriers (CCs) in LTE, thereby realizing an improvement in a maximum transmission rate (See NPL 2). When a terminal uses a plurality of CCs, one CC is configured as a primary cell (PCell) and a remaining CC is configured as a secondary cell (SCell). The configuration of the PCell and SCell may vary for each terminal.

Further, a resource allocation method termed "cross-carrier scheduling" which performs an inter-cell interference control in units of CCs in PDCCH has been introduced in the LTE-Advanced system. In cross carrier scheduling, a base station can transmit DL grants and UL grants for other CCs in the PDCCH region of the CC having good channel quality (for example, see FIG. 3B). If cross carrier scheduling is adopted, a PDCCH is transmitted from different a CC between adjacent cells, thereby allowing the inter-cell interference of PDCCH to be reduced.

In cross carrier scheduling, since resource allocation information is transmitted for each CC, the PDCCH increases in proportion to the number of allocated CCs. Therefore, as the number of CCs increases, search spaces are overlapped between different terminals, and thus the probability of blocking (collision) increases. Furthermore, there is a possibility that blocking occurs not only between different terminals but also between PDCCHs of different CCs intended for a single terminal. The blocking between PDCCHs of the single terminal limits the number of CCs that can be simultaneously allocated to the same terminal and limits a maximum transmission rate for each terminal. Therefore, in PDCCHs of the LTE-Advanced system, a method is adopted in which at the time of calculating a search space, consecutive CCE regions different from each other are configured as search spaces for CCs by using CIF (Carrier Indication Field) given to each of the CCs, in addition to UE IDs.

In addition, "localized allocation" which allocates ePDCCHs collectively at positions close to each other on the frequency band, and "distributed allocation" which allocates the ePDCCHs by distributing ePDCCHs on the frequency band have been studied as allocation methods for ePDCCHs (for example, see FIG. 4). The localized allocation is an allocation method for obtaining a frequency scheduling gain, and can be used to allocate an ePDCCH to a resource that has favorable channel quality based on channel quality information. The distributed allocation distributes ePDCCHs on the frequency axis, and can obtain a frequency diversity gain. In the LTE-Advanced system, both a search space for localized allocation and a search space for distributed allocation may be configured (for example, see FIG. 4).

Furthermore, dividing each PRB pair into a plurality of resources in an ePDCCH has been studied. Resources obtained by dividing the PRB pair may be referred to as eCCEs (enhanced control channel elements) or eREGs (enhanced resource element groups). In addition, in the following description, eCCEs may be simply referred to as "CCEs." The number of REs forming one CCE in a PDCCH is fixedly configured to 36 REs, but the number of REs forming one CCE in an ePDCCH varies depending on a division method. As the division method, a division method in units of subcarriers or a division method by generating resource (RE) groups have been studied. FIG. 5 illustrates an example in which a plurality of PRB pairs are configured as search spaces for ePDCCHs and each PRB pair is divided into four CCEs in units of subcarriers. In FIG. 5, CCEs obtained by dividing each PRB pair are referred to as CCE #(4N), CCE #(4N+1), CCE #(4N+2), CCE #(4N+3), respectively (where, N=0, 1, 2, and 3).

CITATION LIST

Non-Patent Literature

NPL 1
3GPP TS 36.216 V10.1.0 "Physical layer for relaying operation"
NPL 2
3GPP TS 36.213 V10.4.0 "Physical layer procedures"

BRIEF SUMMARY

Technical Problem

The application of cross carrier scheduling even in the ePDCCHs described above has been considered. However, the application of cross carrier scheduling in the ePDCCHs has not been investigated so far.

An object of the present disclosure is to provide a transmission apparatus, a reception apparatus, a transmission method, and a reception method each of which makes it possible to properly perform cross carrier scheduling in ePDCCHs.

Solution to Problem

A transmission apparatus according to an aspect of the present disclosure includes: a configuration section that configures, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and a transmission section that transmits control information mapped to the first search space and control information mapped to the second search space.

A reception apparatus according to an aspect of the present disclosure includes: a configuration section that configures, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and a reception section that receives control information mapped to the first search space and control information mapped to the second search space.

A transmission method according to an aspect of the present disclosure includes: configuring, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and transmitting control information mapped to the first search space and control information mapped to the second search space.

A reception method according to an aspect of the present disclosure includes: configuring, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and receiving control information mapped to the first search space and control information mapped to the second search space.

Advantageous Effects of Disclosure

According to the present disclosure, it is possible to properly perform cross carrier scheduling in ePDCCHs.

BRIEF DESCRIPTION OF THE SEVERAL VIEWS OF THE DRAWINGS

FIGS. 3A and 3B are diagrams illustrating non cross carrier scheduling and cross carrier scheduling, respectively;

DETAILED DESCRIPTION

Figure 1:
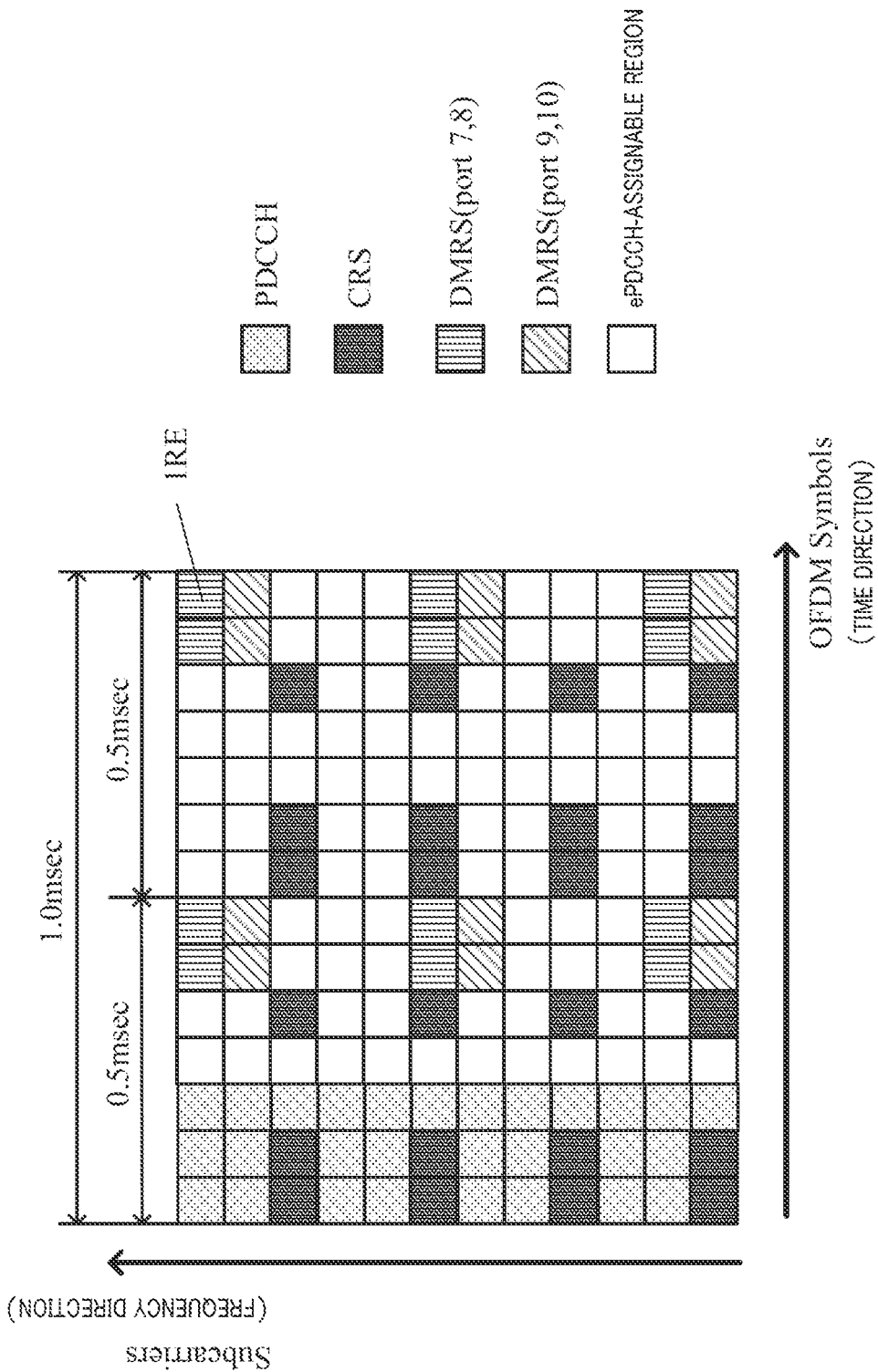
FIG. 1 is a diagram provided for describing a PRB pair.
Figure 2:
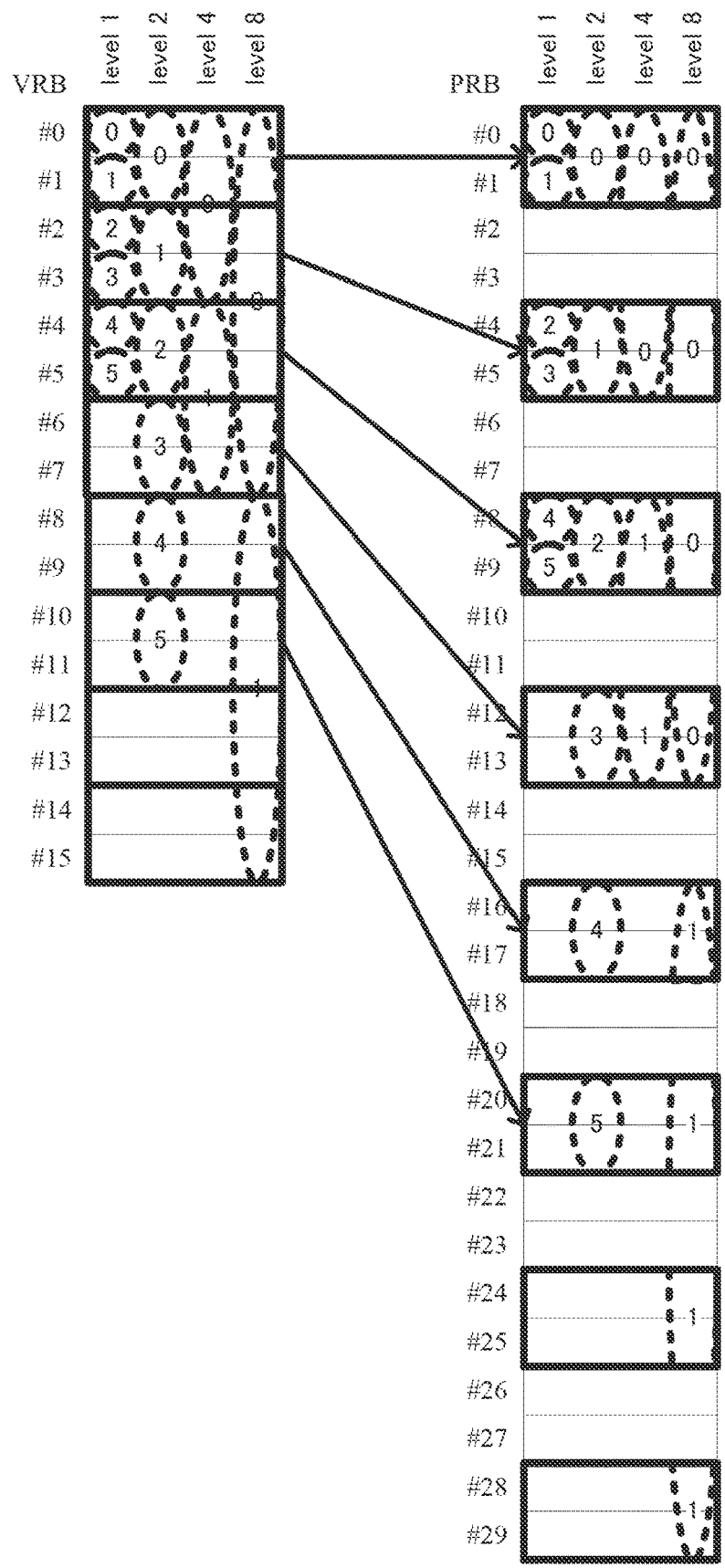
FIG. 2 illustrates an example of search spaces corresponding to R-PDCCHs.
Figure 4:
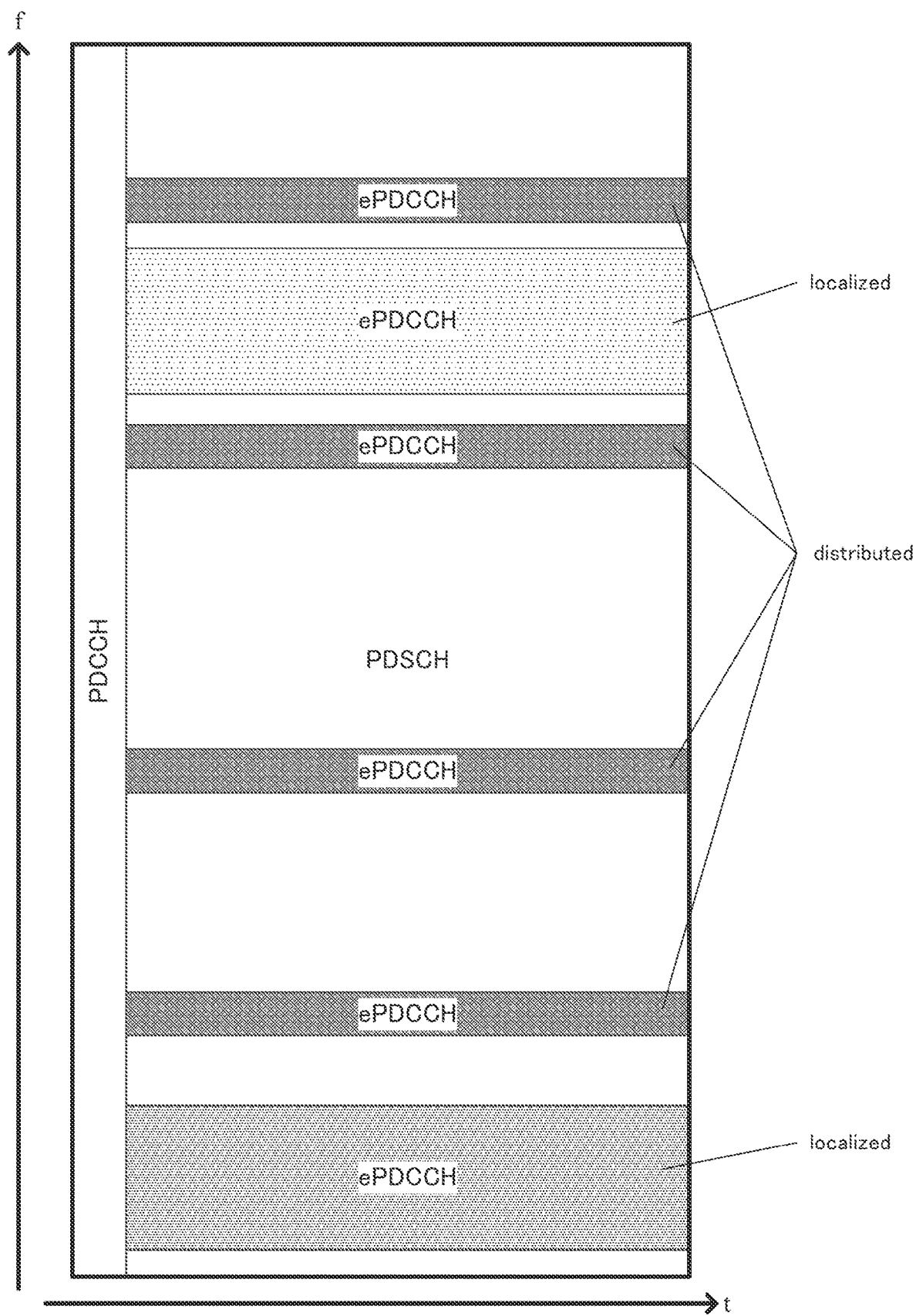
FIG. 4 illustrates an example of localized allocation and distributed allocation of ePDCCHs.
Figure 5:
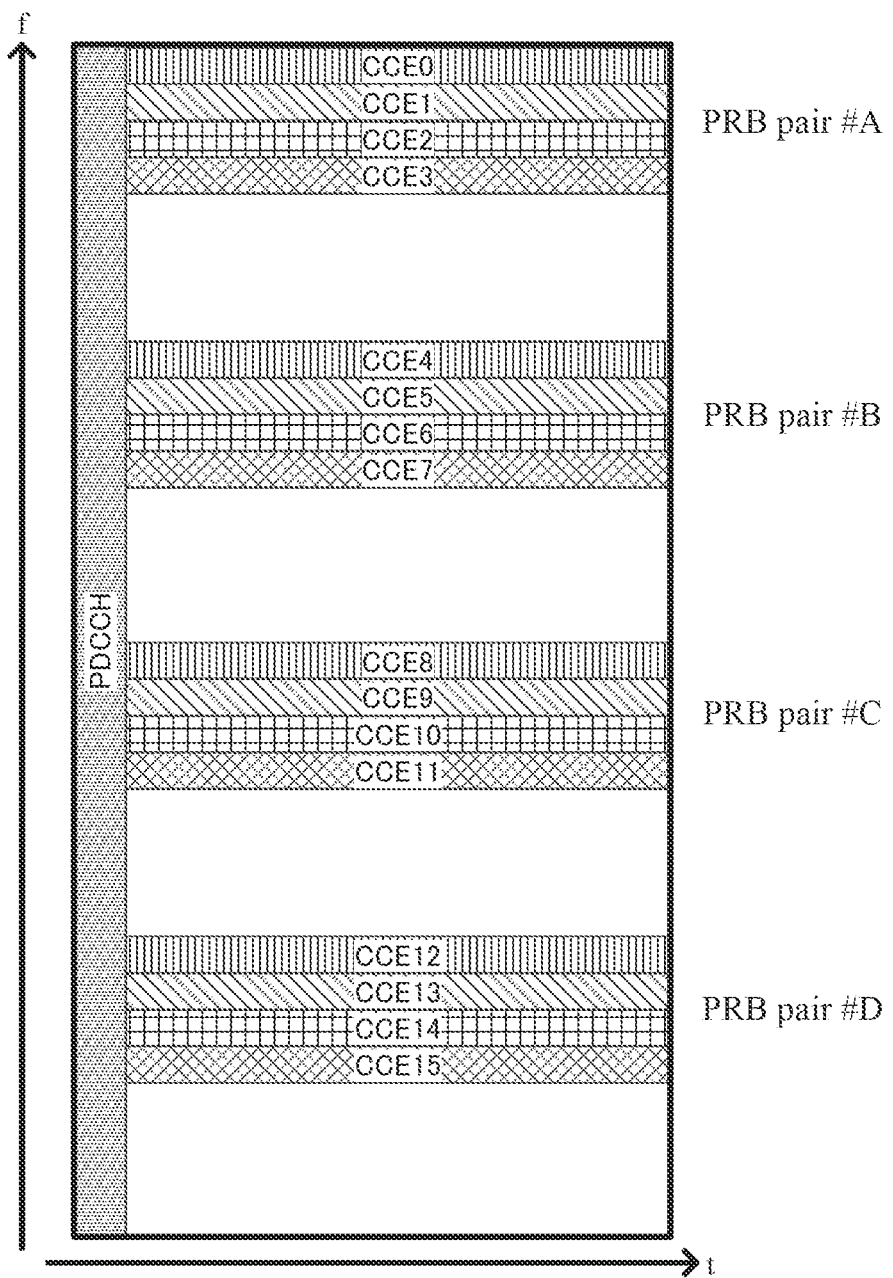
FIG. 5 is a diagram provided for describing division of ePDCCHs.

Embodiments of the present disclosure will be described in detail hereunder with reference to the accompanying drawings. Throughout the embodiments, the same elements are assigned the same reference numerals, and any duplicate description of the elements is omitted.

Embodiment 1

[Communication System Overview]

A communication system according to the present embodiment includes a transmission apparatus and a reception apparatus. In particular, the present embodiment is described by taking base station 100 as the transmission apparatus and taking terminal 200 as the reception apparatus. The communication system is, for example, an LTE-Advanced system. Base station 100 is, for example, a base station that supports the LTE-Advanced system, and terminal 200 is, for example, a terminal that supports the LTE-Advanced system.

Figure 6:
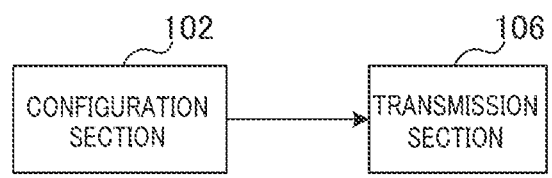
FIG. 6 is a block diagram illustrating main components of a base station according to Embodiment 1 of the present disclosure.

FIG. 6 is a block diagram illustrating main components of base station 100 according to the present embodiment.

In base station 100, when communication is performed using a plurality of CCs, configuration section 102 configures a first search space that is a candidate to which control information (a DL assignment, a UL grant, and the like) for a first CC is assigned and a second search space that is a candidate to which control information for a second CC other than the first CC among the plurality of CCs is assigned, within the same allocation unit group among a plurality of allocation unit groups (here, RBGs) included in a region to which data can be assigned (PDSCH region) (hereinafter, may be referred to as "data-assignable region") within the first CC Transmission section 106 transmits control information mapped to the first search space and control information mapped to the second search space, the first and the second search spaces being configured by configuration section 102.

Figure 7:
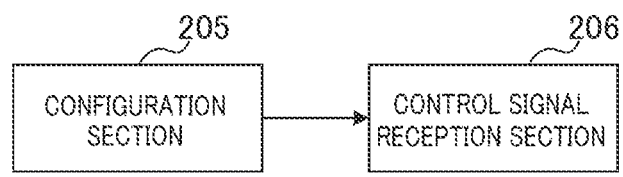
FIG. 7 is a block diagram illustrating main components of a terminal according to Embodiment 1 of the present disclosure.

FIG. 7 is a block diagram illustrating main components of terminal 200 according to the present embodiment.

In terminal 200, when communication is performed using a plurality of CCs, configuration section 205 configures a first search space that is a candidate to which control information (a DL assignment, a UL grant, and the like) for a first CC is assigned and a second search space that is a candidate to which control information for a second CC other than the first CC among the plurality of CCs is assigned, in the same allocation unit group among a plurality of allocation unit groups (here, RBGs) included in a data-assignable region (PDSCH region) within the first CC.

Control signal reception section 206 extracts control information mapped to each of the first search space and the second search space configured by configuration section 205. Thus, control information transmitted from base station 100 is received.

[Configuration of Base Station 100]

Figure 8:
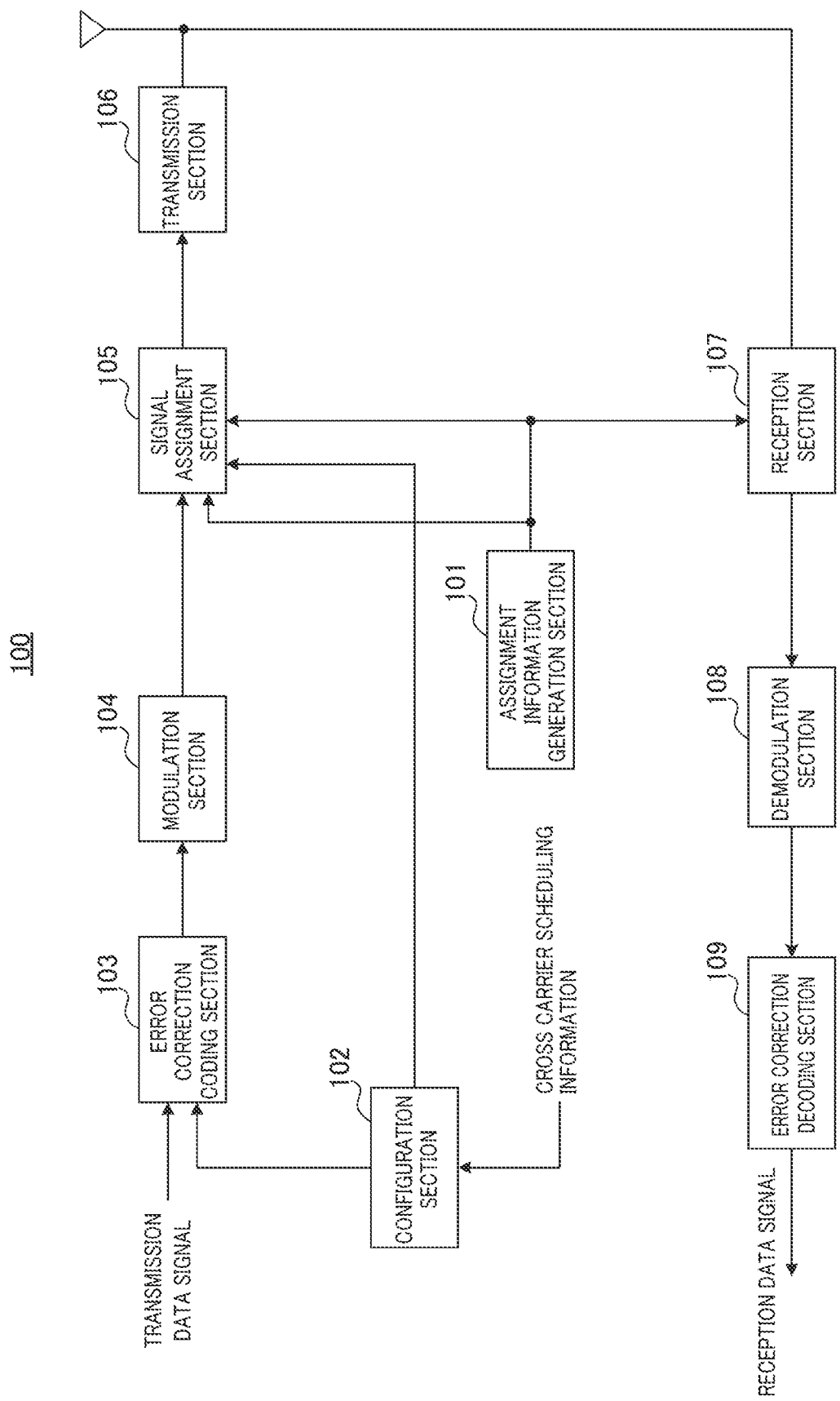
FIG. 8 is a block diagram illustrating a configuration of the base station according to Embodiment 1 of the present disclosure.

FIG. 8 is a block diagram illustrating a configuration of base station 100 according to the present embodiment. As illustrated in FIG. 8, base station 100 includes assignment information generation section 101, configuration section 102, error correction coding section 103, modulation section 104, signal assignment section 105, transmission section 106, reception section 107, demodulation section 108, and error correction decoding section 109.

In a case where there is a downlink data signal (DL data signal) to be transmitted and an uplink data signal (UL data signal) to be assigned to an uplink (UL), assignment information generation section 101 determines resources (RB) to which the data signals are assigned, and generates assignment information (DL assignment and UL grant). The DL assignment includes information relating to assignment of the DL data signal. The UL grant includes information relating to allocated resources for the UL data signal to be transmitted from terminal 200. The DL assignment is outputted to signal assignment section 105, and the UL grant is outputted to reception section 107.

Configuration section 102 configures search spaces for a PCell and SCell with respect to each terminal 200 using ePDCCHs, based on cross carrier scheduling information. The search spaces are formed by a plurality of mapping candidates. Each of the "mapping candidates" is formed by CCEs of the same number as the value of the aggregation level. Further, "CCEs" are obtained by dividing each PRB pair into a predetermined number. For example, cross carrier scheduling information includes information relating to the PCell and SCell configured with respect to each terminal 200.

For example, configuration section 102 determines search spaces (CCEs and RBs used for search spaces) of the PCell configured for terminal 200. In addition, when cross carrier scheduling is configured with respect to terminal 200, configuration section 102 determines search spaces for the SCell based on the search spaces for the PCell, calculation equations that are held in advance, and values (for example, CIF) by which the SCell can be identified. In the above calculation equations, PRB pairs within the same RBG are preferentially configured as search spaces such that the ePDCCHs intended for the same terminal are to be transmitted in the same RBG. In addition, in the above calculation equations, the search spaces for the SCell are configured in the PRB pair obtained by shifting the PRB pair in which the search spaces for the PCell are configured using CIF so that the search spaces for CCs, to which control information transmitted from the same CC are mapped, do not collide. Note that process of configuring a search space performed by configuration section 102 is described in detail hereinafter.

Configuration section 102 outputs information relating to a search space which has been configured (hereinafter, may also be referred to as "search space information") to signal assignment section 105. Configuration section 102 also outputs information relating to PRB pairs that have been configured as a search space for the PCell to error correction coding section 103 as control information.

Error correction coding section 103 receives a transmission data signal (DL data signal) and control information received from configuration section 102 as input signals, performs error correction coding on the input signals, and outputs the processed signals to modulation section 104.

Modulation section 104 modulates the signals received from error correction coding section 103, and outputs the modulated data signal to signal assignment section 105.

Signal assignment section 105 assigns the assignment information (DL assignment and UL grant) received from assignment information generation section 101 to any CCE among CCEs (CCEs in mapping candidate units) indicated by search space information received from configuration section 102. Signal assignment section 105 also assigns the data signal received from modulation section 104 to a downlink resource corresponding to the assignment information (DL assignment) received from assignment information generation section 101.

A transmission signal is formed by assignment information and a data signal being assigned to predetermined resources in this manner. The thus-formed transmission signal is outputted to transmission section 106.

Transmission section 106 executes radio transmission processing such as up-conversion on the input signal, and transmits the obtained signal to terminal 200 via an antenna.

Reception section 107 receives a signal transmitted from terminal 200 via an antenna, and outputs the received signal to demodulation section 108. More specifically, reception section 107 separates a signal that corresponds to a resource indicated by a UL grant received from assignment information generation section 101 from the received signal, and executes reception processing such as down-conversion on the separated signal and thereafter outputs the obtained signal to demodulation section 108.

Demodulation section 108 executes demodulation processing on the input signal, and outputs the obtained signal to error correction decoding section 109.

Error correction decoding section 109 decodes the input signal to obtain the received data signal from terminal 200.

[Configuration of Terminal 200]

Figure 9:
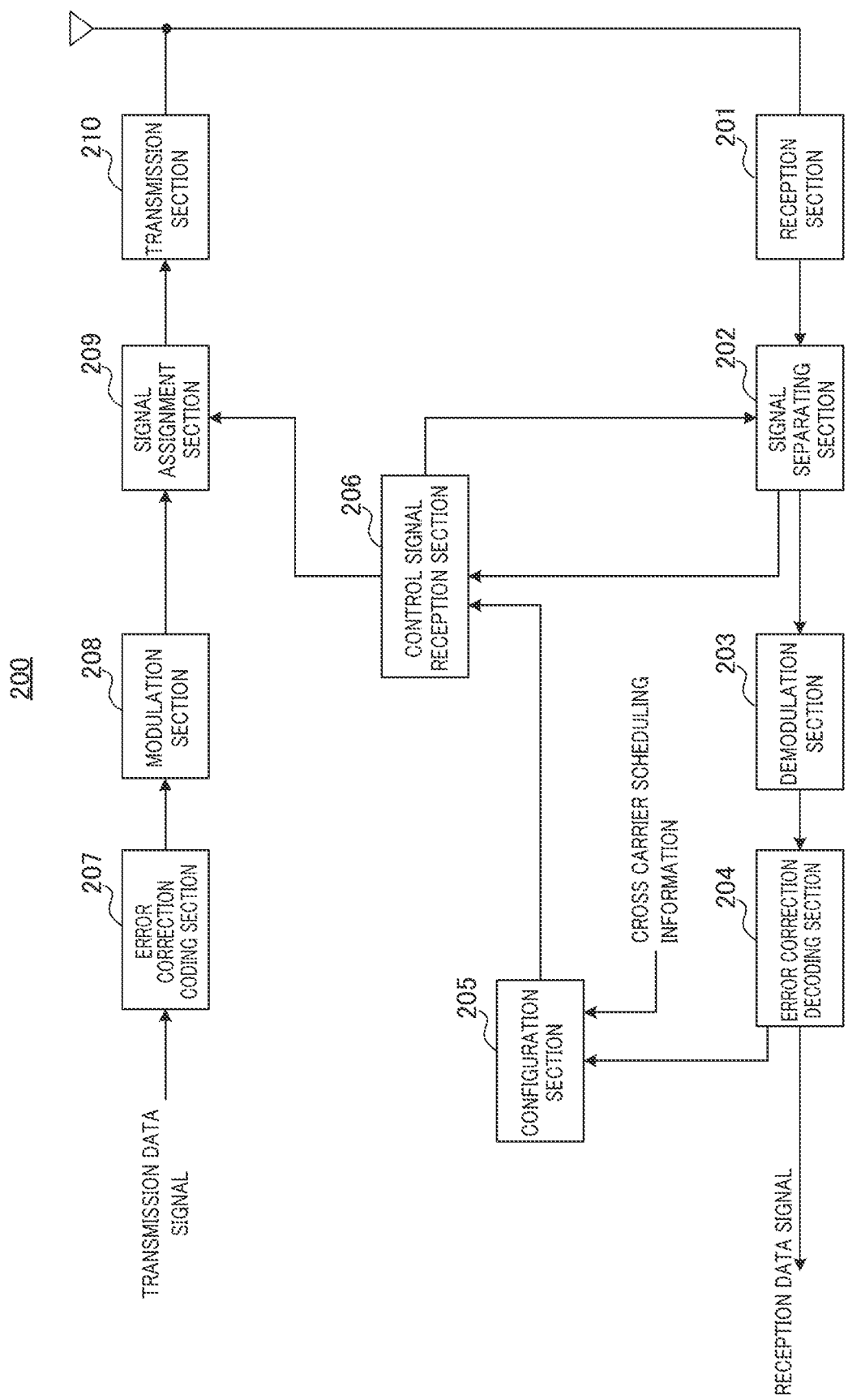
FIG. 9 is a block diagram illustrating a configuration of the terminal according to Embodiment 1 of the present disclosure.

FIG. 9 is a block diagram illustrating the configuration of terminal 200 according to the present embodiment. As illustrated in FIG. 9, terminal 200 includes reception section 201, signal separating section 202, demodulation section 203, error correction decoding section 204, configuration section 205, control signal reception section 206, error correction coding section 207, modulation section 208, signal assignment section 209, and transmission section 210.

Reception section 201 receives a signal transmitted from base station 100 via an antenna, and after executing reception processing such as down-conversion on the received signal, outputs the processed signal to signal separating section 202.

Signal separating section 202 extracts a control signal relating to resource allocation from the reception signal received from reception section 201, and outputs the extracted signal to control signal reception section 206. Signal separating section 202 also extracts from the reception signal a signal corresponding to a data resource (that is, a DL data signal) indicated by the DL assignment output from control signal reception section 206, and outputs the extracted signal to demodulation section 203.

Demodulation section 203 demodulates the signal outputted from signal separating section 202, and outputs the demodulated signal to error correction decoding section 204.

Error correction decoding section 204 decodes the demodulated signal outputted from demodulation section 203, and outputs the obtained received data signal. In particular, error correction decoding section 204 outputs "information relating to PRB pairs configured as search spaces for the PCell" transmitted as a control signal from base station 100, to configuration section 205.

Configuration section 205 specifies search spaces configured for terminal 200 of configuration section 205 that uses the ePDCCHs, based on cross-carrier scheduling information. For example, first, configuration section 205 specifies PRB pairs configured as the search spaces for the PCell based on information received from error correction decoding section 204. Next, configuration section 205 specifies search spaces for the SCell, based on the search spaces for the PCell, a calculation equation held in advance, and a value (for example, a CIF) by which the SCell can be identified. The above calculation equation is shared between base station 100 and terminal 200. In other words, in a similar manner to configuration section 102, configuration section 205 configures the search spaces for terminal 200 of configuration section 205. Configuration section 205 outputs information relating to PRB pairs and CCEs configured as the search space to control signal reception section 206. In addition, search space configuration processing performed by configuration section 205 is described in detail later.

In a signal component received from signal separating section 202, control signal reception section 206 detects a control signal (DL assignment or UL grant) intended for terminal 200 of signal separating section 202 by performing blind decoding with respect to CCEs indicated by information received from configuration section 205. That is, control signal reception section 206 receives a control signal mapped to one mapping candidate among a plurality of mapping candidates forming a search space configured by configuration section 205. Control signal reception section 206 outputs a detected DL assignment intended for terminal 200 of control signal reception section 206 to signal separating section 202, and outputs a detected UL grant intended for terminal 200 of control signal reception section 206 to signal assignment section 209.

When a transmission data signal (UL data signal) is inputted to error correction coding section 207, error correction coding section 207 performs error correction coding on the transmission data signal and outputs the obtained signal to modulation section 208.

Modulation section 208 modulates the signal outputted from error correction coding section 207, and outputs the modulated signal to signal assignment section 209.

Signal assignment section 209 assigns the signal outputted from modulation section 208 according to the UL grant received from control signal reception section 206, and outputs the obtained signal to transmission section 210.

Transmission section 210 executes transmission processing such as up-conversion on the input signal, and transmits the obtained signal.

[Operations of Base Station 100 and Terminal 200]

The operations of base station 100 and terminal 200 each configured in the manner described above will be described.

In the following description, it is assumed that a plurality of CCs are configured for terminal 200. Further, it is assumed that an ePDCCH is used as an allocated resource of control information intended for terminal 200 (DL assignment or UL grant), and cross carrier scheduling is configured for the ePDCCH. Furthermore, in cross carrier scheduling, it is assumed that a CC to which control information for each CC configured for terminal 200 is assigned is the PCell. In other words, search spaces to which control information for the PCell intended for terminal 200 are assigned and search spaces to which control information for the SCell are assigned are configured in the PCell.

Here, in the ePDCCH, similar to the case of a PDCCH, blocking between the ePDCCHs of CCs needs to be reduced. Since the ePDCCHs are mapped in a PDSCH region (data-assignable region), blocking with a PDSCH needs to be reduced in addition to the blocking between the ePDCCHs.

As described above, the PDSCH is assigned in RBG units. Accordingly, base station 100 cannot assign data as a PDSCH to a terminal which cannot recognize the presence of the ePDCCH, for example, terminals of rel. 8, 9, and 10 in an RBG including a PRB pair used as the ePDCCH. Therefore, it is preferable to ensure a larger number of RBGs that can be used as a PDSCH by further reducing RBGs including PRB pairs used for ePDCCHs.

Therefore, in the present embodiment, when cross carrier scheduling is applied to ePDCCHs, configuration section 102 of base station 100 preferentially configures search spaces for ePDCCHs of a plurality of CCs configured for terminal 200 within the same RBG. Specifically, configuration section 102 configures search spaces for the ePDCCH for the PCell and search spaces for the ePDCCH for the SCell, within the same RBG, among a plurality of RBGs included in a PDSCH region within the PCell configured for terminal 200. At this time, configuration section 102 configures different PRB pairs within the same RBG to search spaces for the ePDCCH for the PCell and search spaces for the ePDCCH for the SCell.

As a search space configuration example at the time of cross carrier scheduling in the present embodiment, a description will be given of a case where a CIF value (CIF number) configured in each CC is used.

Specifically, within the same RBG, the configuration section 102 configures PRB pairs (PRB pairs different from the PRB pairs configured as the search spaces for the PCell) obtained by cyclically shifting the PRB pairs configured as the search spaces for the PCell, as the search spaces for the SCell. In this case, configuration section 102 uses the CIF number configured in each SCell as the amount of the cyclic shift. In other words, configuration section 102 configures PRB pairs obtained by cyclically sifting the PRB pairs of the PCell by the value of the CIF number configured for each SCell, within the same RBG as the RBG to which PRB pairs configured as the search space for a reference CC (here, the PCell) belong, as the search spaces for the SCell having the CIF number.

Further, in a case where the CIF number (it is assumed that CIF=0, 1, 2, . . . ) corresponding to the cyclic shift value is equal to or greater than the RBG size (the number of PRB pairs forming one RBG), configuration section 102 configures a PRB pair within another RBG adjacent to the RBG to which the PRB pairs configured as the search space for the PCell belongs, as the search space for the SCell having the CIF number. In other words, configuration section 102 shifts the search space for the SCell corresponding to the CIF number equal to or greater than the RBG size, an RB within an RBG adjacent to the RBG in which the search space for the PCell is configured.

For example, configuration section 102 configures the search spaces for the SCell according to Equation 1 below.

[1]

$$N_{RB,n_{CL}} = \text{floor}(n_{CL}/\text{RBGsize}) \cdot \text{RBGsize} + N_{RBG,0} \cdot \text{RBGsize} + (N_{RB,0} + n_{CL}) \bmod(\text{RBGsize}) \quad \text{(Equation 1)}$$

In Equation 1, $n_{CL}$ indicates the CIF number ($n_{CL}$=0,1, 2, . . . ), $N_{RB,n_{CL}}$ indicates an RB number of the search space for CC of which the CIF number is $n_{CL}$, $N_{RB,0}$ indicates the RB number (PRB pair number) of the search spaces for the PCell ($n_{CL}=0$) that is a reference CC, and $N_{RBG,0}$ indicates the RBG number with which the search spaces for the PCell ($n_{CL}=0$) are configured. In addition, a function floor (x) indicates a function that returns a value obtained by rounding off to the nearest whole number x, and an operator mod indicates a modulo operation.

The first term of Equation 1 [floor($n_{CL}$/RBGsize)·RBGsize] indicates a shift value in RBG units from the PCell with respect to the search space for the SCell of which the CIF number is $n_{CL}$. For example, if the value of the first term is 0, the search space is configured within the same RBG as the PCell.

The second term [$N_{RBG,0}$·RBGsize] of Equation 1 indicates the smallest RB number among RB numbers of PRB pairs forming the RBG (RBG number is $N_{RBG,0}$) in which the search space for the PCell is configured, and becomes a reference value of a shift value of RB number.

The third term of Equation 1 [($N_{RB,0}+n_{CL}$) mod (RBGsize)] indicates a shift value within the RBG from the RB number corresponding to PRB pairs configured as the search space ($N_{RB,0}$) of the PCell, with respect to the search space for the SCell of which the CIF number is $n_{CL}$.

That is, the second and third terms of Equation 1 indicate a cyclic shift.

Thus, the search space for each CC at the time of cross carrier scheduling is configured to different PRB pairs obtained by cyclically shifting the PRB pair within the same RBG as PRB pairs configured as the search spaces for the PCell, by the value of the CIF number. In addition, when the CIF number is equal to or greater than the RBG size, the search space for the SCell having the CIF number is configured in a PRB pair within the RBG adjacent to the RBG in which the search spaces for the PCell are configured.

Figure 10:
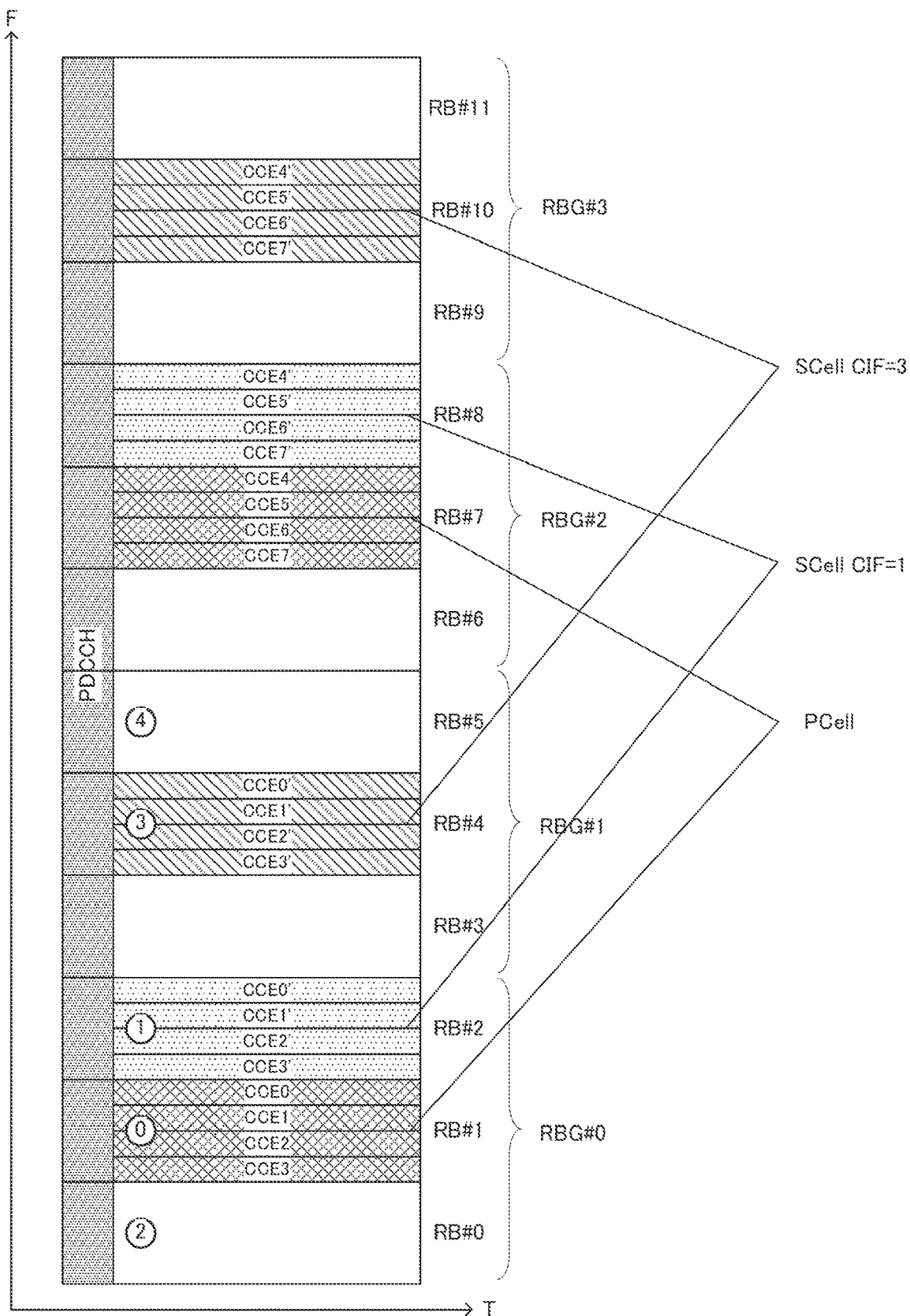
FIG. 10 is a diagram illustrating a search space configuration according to Embodiment 1 of the present disclosure.

FIG. 10 is a diagram illustrating a search space configuration example at the time of cross carrier scheduling in a case where a PCell and two the SCells are configured for terminal 200.

In FIG. 10, it is assumed that the RBG size is 3 (RBG size=3), the CIF number of one SCell is 1 (CIF=1), and the CIF number of the other SCell is 3 (CIF=3). Further, in FIG. 10, it is assumed that the aggregation level is 4. Furthermore, as illustrated in FIG. 10, the search spaces for the PCell (CIF=0) are configured in RB #1 (CCE0 to CCE3) belonging to RBG #0 and RB #7 (CCE4 to CCE7) belonging to RBG #2.

First, the SCell of CIF=1 (less than RBG size (=3)) is described. As illustrated in FIG. 10, configuration section 102 configures RB #2 and RB #8 obtained by cyclically shifting RB #1 and RB #7 configured as the search spaces for the PCell by the value of the CIF number (that is, one RB), as the search spaces for the SCell of CIF=1. As illustrated in FIG. 10, the PRB pairs (RB #1, RB #7) configured as the search spaces for the PCell and the PRB pairs (RB #2, RB #8) configured as the search spaces for the SCell of CIF=1 are to be respectively configured within the same RBGs (RBG #0 and RBG #2) and are different from each other.

Subsequently, the SCell of CIF=3 (equal to or greater than RBG size (=3)) is described. As illustrated in FIG. 10, configuration section 102 cyclically shifts RB #1 and RB #7 in which the search spaces for the PCell are configured, by the value of the CIF number (that is, three RBs), at the time of configuring the search spaces for the SCell of CIF=3. However, since the CIF number (=3) is equal to or greater than the RBG size (RBG size=3), configuration section 102 configures the search spaces for the SCell of CIF=3 within RBG #1 and RBG #3 respectively adjacent to RBG #0 and RBG #2 in which the search spaces for the PCell are configured. In other words, configuration section 102 configures the search spaces for the SCell of CIF=3, in RB #4 belonging to RBG #1 and RB #10 belonging to RBG #3.

In other words, as illustrated in FIG. 10, the search spaces for the SCell having the CIF numbers (CIF=1, 2) less than the RBG size are respectively configured in cyclically shifted different PRB pairs within the RBGs to which the PRB pairs configured as the search spaces for the PCell (CIF=0) belong. On the other hand, the search spaces for the SCell having the CIF numbers (CIF=3, 4) equal to or greater than the RBG size are respectively configured within the RBGs adjacent to the RBGs to which the PRB pairs configured as the search spaces for the PCell (CIF=0) belong. At this time, as illustrated in FIG. 10, the search spaces for the SCell are respectively configured in PRB pairs cyclically shifted from, as the starting point, the PRB pairs (RB #4 of RBG #1 and RB #10 of RBG #3) corresponding to the position (that is, the second RB from the minimum RB number within the RBG) of RB #1 (and RB7 of RBG #2) in RBG #0 in which the search spaces for the PCell are configured, in the adjacent RBG.

Circled numbers '0' to '4' illustrated in FIG. 10 represent a cyclic shift pattern (shift order) relative to the PRB pairs configured as the search space for the PCell (corresponding to circled number '0', RB #1 in FIG. 10).

On the other hand, similar to configuration section 102, configuration section 205 of terminal 200 specifies search spaces for each CC configured for terminal 200. Specifically, first, configuration section 205 acquires information (for example, RBG number and RB number) relating to PRB pairs configured as the search spaces for the PCell, from base station 100. Subsequently, configuration section 205 configures the PRB pairs obtained by cyclically shifting PRB pairs configured as the search spaces for the PCell, by the value of the CIF number configured in each SCell, as the search spaces for the SCell. Further, when the CIF number is equal to or greater than the RBG size, configuration section 205 configures the search spaces for the SCell within the RBGs respectively adjacent to RBGs to which the PRB pairs configured as the search spaces for the PCell belong. For example, configuration section 205 configures the search spaces for the SCell based on RBs configured as the search spaces for the PCell and a calculation Equation (Equation 1) which is held in advance.

As described above, in the present embodiment, when communication with terminal 200 is performed using a plurality of CCs, base station 100 and terminal 200 configure search spaces as candidates to which control information for the PCell is assigned and search spaces as candidates to which control information for SCells (CCs other than PCell) is assigned in the same RBG among a plurality of RBGs, each of which is formed by a plurality of PRB pairs included in the PDSCH region within the PCell.

Thus, since the search spaces for ePDCCHs at the time of cross carrier scheduling tends to be configured in RBG units, it is possible to secure more RBGs to which data can be assigned in the PDSCH region. In other words, according to the present embodiment, it is possible to reduce a blocking occurrence rate of PDSCH to be allocated in RBG units and the search spaces for ePDCCHs.

Further, in the present embodiment, base station 100 and terminal 200 configure different PRB pairs within the same RBG as search spaces for the ePDCCH of each CC. This enables the reduction of a blocking occurrence rate between the ePDCCHs of the same aggregation level of each CC.

Furthermore, according to the present embodiment, since the search spaces for other CCs (SCells) are configured based on the search spaces for the PCell, compared to a case where the search spaces are individually configured for each CC, it is possible to reduce the number of bits of a higher layer necessary for configuring the search spaces. Further, in the present embodiment, at the time of search space configuration, the CIF number of each CC that is an existing parameter is used as a parameter for determining a cyclic shift value from the search spaces for the PCell. Thus, since there is no need to newly use a parameter for the search space configuration, it is possible to avoid increases in the number of bits necessary for configuring the search spaces.

Furthermore, according to the present embodiment, in a case where the CIF number is equal to or greater than the RBG size, the search spaces for the SCell having the CIF number is shifted to the RB within the RBG adjacent to the RBG in which the search spaces for the PCell are configured. Thus, even in a case where the CIF number is equal to or greater than the RBG size, the search spaces for the SCell cannot be configured within the same RBG as the search spaces for the PCell, and the search spaces for the SCell can be configured in resources expected to have relatively the same channel quality as the search spaces for the PCell. Since search spaces corresponding to a plurality of CCs configured for terminal 200 are configured in resources having the same degree of channel quality, an aggregation level, a transmission method (for example, presence or absence of transmission diversity), and the like which are selected in each CC can be matched between CCs, thereby facilitating the scheduling processes of base station 100.

In the manner described above, according to the present embodiment, the cross carrier scheduling can be properly performed even with ePDCCHs.

In addition, the present embodiment has been described with a case where the RBG size is three, but the RBG size is not limited to three.

For example, RBG size may be four. In addition, when the RBG size is four, a shift pattern may be determined with respect to the search spaces for the PCell in consideration of units of PRB bundling. The term "PRB bundling" is a technique that uses the same pre-coding in a plurality of adjacent PRB pairs for improving the channel estimation accuracy, in a case where a DMRS (DeModulation Reference Signal) serving as a reference signal and allowing a different beam to be directed to each terminal is used. The unit (PRB bundling unit) using the same pre-coding is called a PRG (Pre-coding Resource block Group). The size of PRG (PRG size) is the same as the RBG size and different values are set depending on the number of PRB pairs included in a system band width. For example, when the RBG size is four or two, the PRG size is two, and when the RBG size is three, PRG size is three. Accordingly, when the RBG size is four, four PRB pairs included in the same RBG form one PRG for each two PRB pairs (see FIG. 11). Therefore, only two PRB pairs within the same RBG are used for ePDCCHs, and when two remaining PRB pairs are allocated to PDSCH, two PRB pairs belonging to PRG supposedly using the same pre-coding are preferably allocated to the PDSCH.

In this respect, when the RBG size is four, for example, base station 100 and terminal 200 may preferentially configure the search spaces for the SCell in PRB pairs within the PRG to which PRB pairs configured as the search spaces for the PCell belong. In other words, among two PRB pairs forming the same PRG, base station 100 and terminal 200 configure one PRB pair as a search space for the PCell and configure the other PRB pair as a search space for the SCell.

Figure 11:
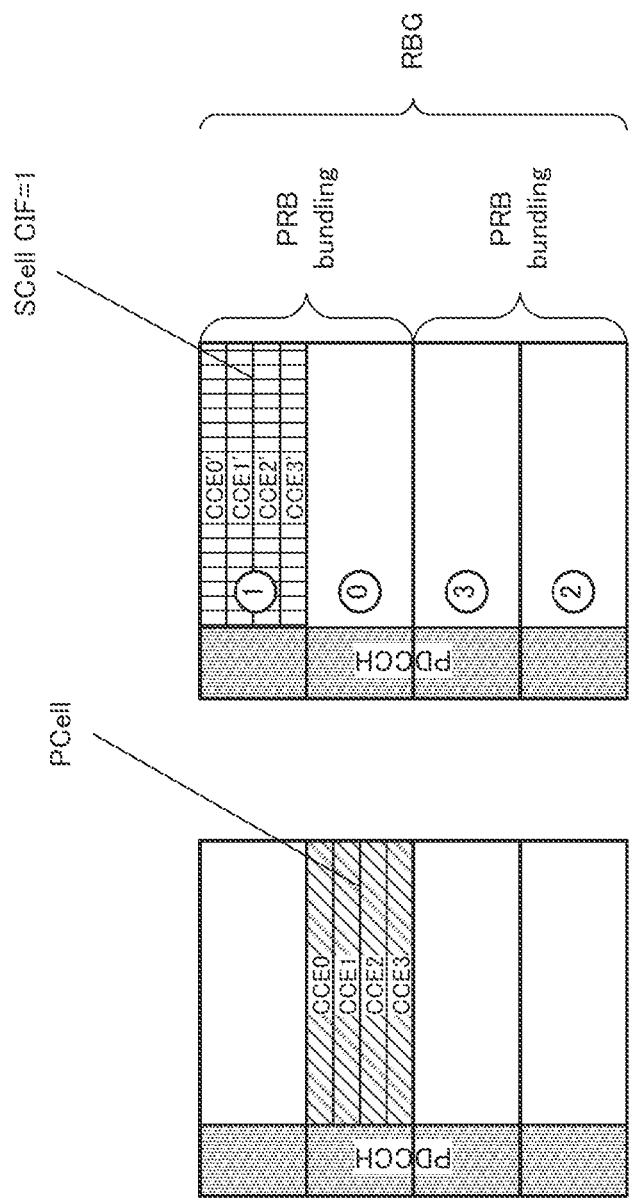
FIG. 11 is a diagram illustrating a search space configuration in consideration of PRB bundling according to Embodiment 1 of the present disclosure.

For example, base station 100 and terminal 200 may configure a shift order of RBs (shift pattern) in such a way as to preferentially shift a PRB pair configured as the search space for the PCell within a PRG to which the PRB pair belongs, and then a shift is made within the RBG to which the PRB pair belong. In FIG. 11, the PRB pair within the PRG to which the PRB pair configured as the search space for the PCell (CIF=0) belongs, is configured as the search space for the SCell of CIF=1. Subsequently, PRB pairs within the RBG to which the PRB pair configured as the search space for the PCell (CIF=0) belongs and PRG pairs other than the PRG to which PRB pair configured as the search space for the PCell (CIF=0) belongs are configured as the search spaces for the SCells of CIF=2, 3. The two drawings in FIG. 11 illustrate resources (that is, the same resources) to which signals to be transmitted in downlink of the PCell are mapped. For convenience of description, FIG. 11 illustrates search spaces for the CCs configured within one CC (PCell) while the search spaces are classified for the CCs. Circled numbers '0' to '3' illustrated in FIG. 11 represent a cyclic shift pattern based on the PRB pair configured as the search space for the PCell (circled number '0').

Further, in the present embodiment, a description has been given of a case where search spaces are configured in consideration of RBGs, the present disclosure is not limited to this case. For example, search spaces may be configured in consideration of units of sub-bands used at the time of reporting a sub-band CQI. Here, the units of sub-bands are units of PRB pairs used for averaging the channel quality when the terminal reports the channel quality to the base station. For example, a sub-band is formed of six PRB pairs. For example, when localized allocation is used as the resource allocation method, the base station can determine a PRB pair used for transmitting an ePDCCH based on the channel quality report. In addition, when the feedback of channel quality is provided in units of sub-bands, the PRB pairs belonging to the same sub-band are regarded to have the same channel quality by the base station. Therefore, base station 100 and terminal 200 may configure search spaces for a plurality of CCs within the same sub-band (that is, different PRB pairs within the same sub-band). In other words, base station 100 and terminal 200 may configure the search spaces for an SCell by cyclically shifting PRB pairs configured as the search space for the PCell within the PRB pairs of the same sub-band, in preference to the PRB pairs of the same RBG. In this manner, the ePDCCHs of a plurality of CCs can be mapped to RBs that are expected to have the same channel quality, so that the reception quality between the ePDCCHs of CCs does not change, and it is not necessary to change the selection of the aggregation levels of the ePDCCHs for each CC.

Although the present embodiment describes a case where the search spaces for the SCell are configured by cyclically shifting PRB pairs configured as the search spaces for the PCell, the configuration of the search spaces for the SCell is not limited to the case using the cyclic shift. In other words, a method may be applied in which with respect to PRB pairs configured as the search spaces for the PCell, different PRB pairs belonging to the same RBG are preferentially configured as the search spaces for the SCell.

Embodiment 2

The present embodiment relates to a search space configuration method focused on power of reference signals. Since a base station and a terminal according to the present embodiment have the same basic configuration as base station 100 and terminal 200 according to Embodiment 1, a description will be given with references made to FIGS. 8 and 9.

In the LTE-Advanced system, demodulating ePDCCH using DMRS (DeModulation Reference Signal) with which pre-coding can be changed for each terminal as reference signals has been studied. Since configuring a plurality of antenna ports to which DMRSs are assigned in the same PRB pair (for example, see FIG. 1) makes possible application of MIMO (Multiple Input Multiple Output) transmission.

Further, transmitting the ePDCCHs by multiplexing the ePDCCHs intended for a plurality of terminals in the same PRB pair has been studied in LTE-Advanced. At this time, if different pre-coding is applied for each terminal, it is necessary to respectively transmit DMRSs assigned to the different antenna ports.

Figure 12:
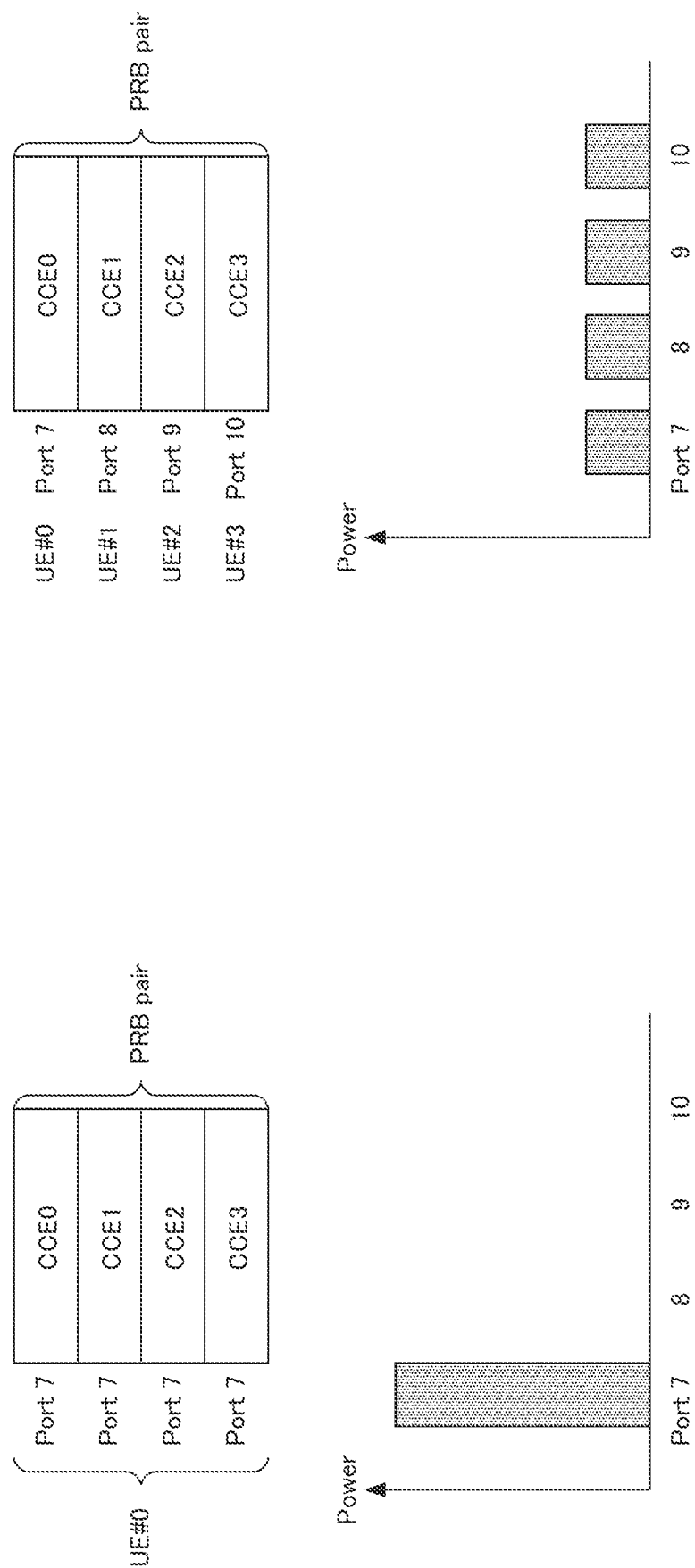
FIGS. 12A and 12B are diagrams each illustrating a relationship between antenna ports and DMRS transmission power according to Embodiment 2 of the present disclosure.

However, when DMRSs are transmitted from a plurality of antenna ports in the same PRB pair, there is a problem in that the transmission power of each antenna port needs to be reduced. FIGS. 12A and 12B each illustrate a relationship between antenna ports and transmission power of DMRSs. FIG. 12A illustrates a case where all CCEs (CCE0 to CCE3) in the PRB pair are allocated to the same terminal (UE #0) and only an antenna port 7 (port7) is used. FIG. 12B illustrates a case where all CCEs (CCE0 to CCE3) in the PRB pair are respectively allocated to different terminals (UE #0 to UE #3) and antenna ports 7, 8, 9, and 10 are used. In FIGS. 12A and 12B, it is assumed that the total transmission power of all antenna ports is constant.

As illustrated in FIG. 12A, when only the antenna port 7 is used, compared to the case where the antenna ports 7, 8, 9, and 10 are used as illustrated in FIG. 12B, the transmission power of DMRSs per antenna port (port7) can be quadrupled and used. In other words, in the same PRB pair, as the number of terminals decreases, the number of antenna ports to be used decreases, and an increase in transmission power by power boosting becomes possible.

The reception quality of DMRS is very important for improving the channel estimation accuracy, and increasing the transmission power of DMRS is very effective for improving the reception quality of the ePDCCH.

Therefore, in the present embodiment, when cross carrier scheduling is applied to the ePDCCH, configuration section 102 of base station 100 preferentially configures the search spaces (CCEs) of the ePDCCHs of a plurality of CCs configured for terminal 200 in the same PRB pair. Specifically, configuration section 102 configures the search spaces for the ePDCCH for the PCell and the search spaces for the ePDCCH for the SCell in the same PRB pair among a plurality of PRB pairs included in the PDSCH region within the PCell configured for terminal 200. At this time, configuration section 102 configures different CCEs (eREGs) in the same PRB pair as the search spaces for the ePDCCH for the PCell and the search spaces for the ePDCCH for the SCell.

Further, when the search spaces for the ePDCCH of a plurality of CCs are configured within the same PRB pair, configuration section 102 configures DMRS allocated to the same antenna port as a reference signal of an ePDCCH of each CC.

Similar to Embodiment 1, when a CIF number configured in each CC is used will be described as an example of search space configuration at the time of cross carrier scheduling in the present embodiment.

Specifically, configuration section 102 configures CCEs (CCEs different from the CCEs which are configured in the search spaces for the PCell) obtained by cyclically shifting the CCEs which are configured as the search spaces for the PCell in the same PRB pair, as the search spaces for the SCell. At this time, configuration section 102 uses the CIF number configured in each SCell as a cyclic shift amount. In other words, configuration section 102 configures CCEs obtained by cyclically sifting the CCEs of the PCell by the CIF number configured in each SCell, as the search space for the SCell having the CIF number, in the same PRB pair as the CCEs configured as the search space for a basic CC (here, the PCell).

In addition, when the CIF number (it is assumed that CIF=0, 1, 2, . . . ) corresponding to the cyclic shift value is equal to or greater than the number of CCEs forming the PRB pair, configuration section 102 configures CCEs within another PRB pair adjacent to the PRB pair to which the CCEs configured as the search space for the PCell belongs, as the search space for the SCell having the CIF number. In other words, configuration section 102 shifts the search space for the SCell corresponding to the CIF number equal to or greater than the number of CCEs forming the PRB pair, to the CCEs within an PRB pair adjacent to the PRB pair configured as the search space for the PCell.

For example, configuration section 102 configures the search spaces for the SCell, according to Equations 2 and 3. Further, Equation 2 indicates the eREG numbers in which CCEs configured as the search spaces are mapped, and Equation 3 indicates PRB pair numbers (RB numbers) configured as the search spaces. Furthermore, in the present embodiment, the eREG numbers are defined as the numbers given within one PRB pair, and the eREG size is assumed to eREG division number per one PRB pair. Accordingly, in a case where the eREG division number is K, the eREG numbers are #0 to #(K−1).

[2]

$$N_{eREG,n_{CL}} = (N_{eREG,0} + n_{CL}) \bmod(\text{eREGsize}) \quad \text{(Equation 2)}$$

[3]

$$N_{RB,n_{CL}} = \text{floor}(n_{CL}/\text{eREGsize}) + N_{RB,0} \quad \text{(Equation 3)}$$

In Equation 2 and Equation 3, $n_{CL}$ indicates CIF number ($n_{CL}=0,1,2,\ldots$), $N_{RB,n_{CL}}$ indicates RB numbers of the search spaces for CC of which CIF number is $n_{CL}$, $N_{RB,0}$ indicates RB numbers of the search spaces for the PCell ($n_{CL}=0$) that is a reference CC, $N_{RBG,0}$ indicates the RBG number in which the search spaces for the PCell ($n_{CL}=0$) are configured, $N_{eREG,0}$ indicates an eREG number in which the search spaces for the PCell ($n_{CL}=0$) is configured, and $N_{eREG,n_{CL}}$ indicates eREG numbers in which the search spaces for CC, of which CIF number is $n_{CL}$, are configured. In addition, eREG size is a division number of eREG per one PRB pair and has the same number as the number of CCEs (CCE division number) per PRB pair. In addition, a function floor (x) indicates a function that returns a value obtained by rounding off to the nearest whole number x, and operator mod indicates a modulo operation.

Thus, the search spaces for each CC at the time of cross carrier scheduling is configured in the different eREGs obtained by cyclically shifting eREGs corresponding to the CCEs by the CIF number in the PRB pair to which the CCEs configured as the search spaces for the PCell belongs. In addition, in a case where the CIF number is equal to or greater than the number of CCEs (eREG division number) forming one PRB pair, the search spaces for the SCell having the CIF number are configured in CCEs (eREGs) within the PRB pair adjacent to the PRB pair configured as the search spaces for the PCell.

Figure 13:
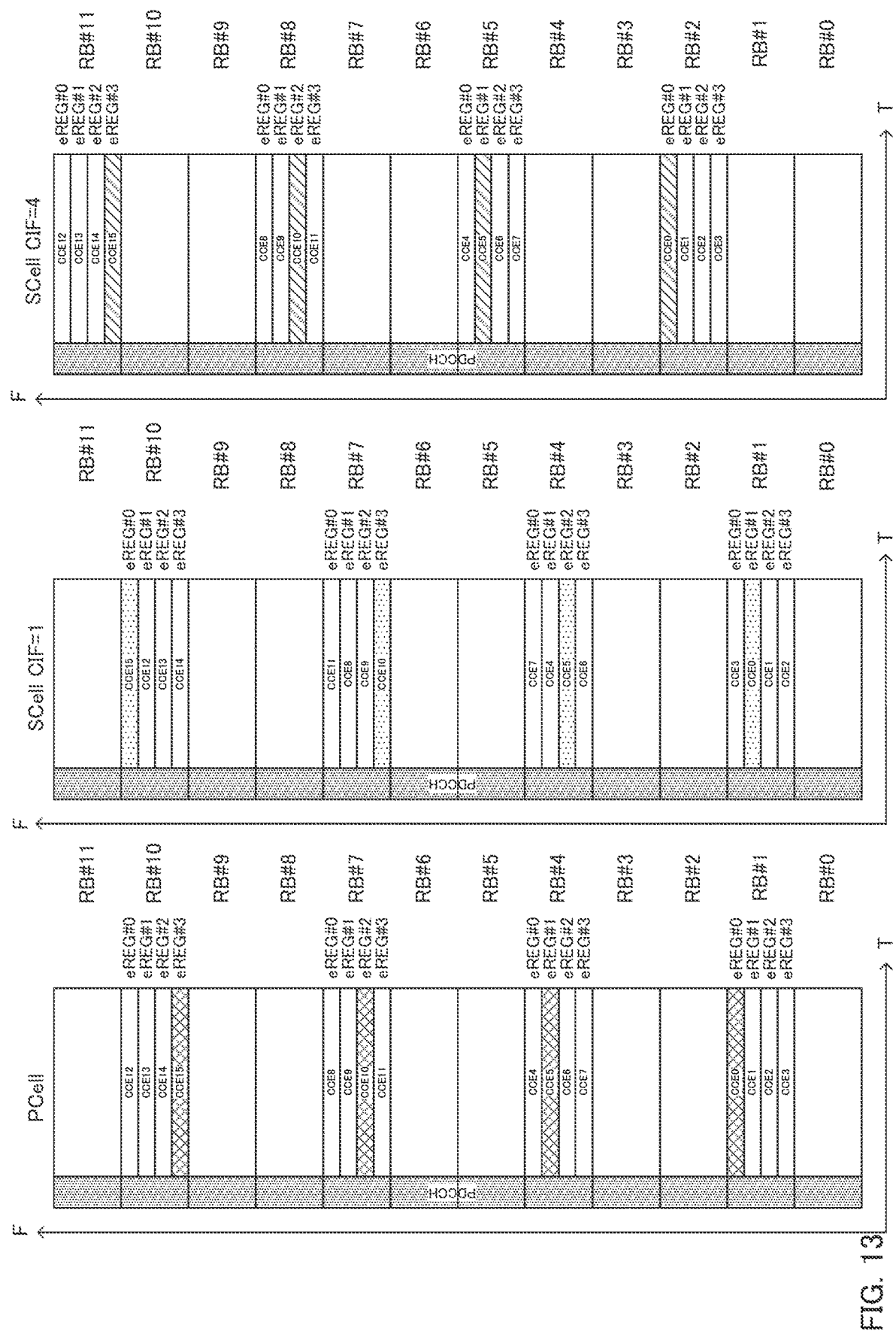
FIG. 13 is a diagram illustrating a search space configuration according to Embodiment 2 of the present disclosure.

FIG. 13 illustrates an example of search space configuration at cross carrier scheduling when one PCell and two SCells are configured for terminal 200. Three drawings illustrated in FIG. 13 show resources (that is, the same resources) in which signals transmitted in downlink of the PCell are mapped. In other words, for the convenience of explanation, FIG. 13 separately shows for each CC, the search spaces for three CCs configured within one CC (PCell).

In FIG. 13, it is assumed that the CIF number of one SCell is 1 (CIF=1), and the CIF number of the other SCell is 4 (CIF=4). Further, in FIG. 13, it is assumed that the aggregation level is 1. Furthermore, in FIG. 13, it is assumed that the number of eREGs (eREG division number) per PRB pair is four (eREG size=4). Furthermore, as illustrated in FIG. 13, the search spaces for the PCell (CIF=0) are configured in eREG #0 (CCE0) belonging to RB #1, eREG #1 (CCE5) belonging to RB #4, eREG #2 (CCE10) belonging to RB #7, and eREG #3 (CCE15) belonging to RB #10.

First, the SCell of CIF=1 (less than eREG division number 4) will be described. As illustrated in FIG. 13, configuration section 102 configures eREG #1 (CCE0) in RB #1 obtained by cyclically shifting the eREG #0 in RB #1 configured as the search space for the PCell by a CIF number amount (that is, one eREG), as the search space for the SCell of CIF=1. In a similar manner, as illustrated in FIG. 13, configuration section 102 configures eREG #2 (CCE5) in RB #4 obtained by cyclically shifting the eREG #1 in RB #4 configured as the search space for the PCell by one eREG, as the search space for the SCell of CIF=1. The search space for the SCell with respect to other PRB pairs (RB #7 and RB #10) configured as the search space for the PCell as illustrated in FIG. 13 is obtained in a similar manner.

As illustrated in FIG. 13, CCEs (eREGs) in which the search spaces for the PCell are configured and CCEs (eREG) in which the search spaces for the SCell of CIF=1 are configured are to be configured in the same PRB pairs (RB #1, RB #4, RB #7 and RB #10). Therefore, configuration section 102 configures DMRSs assigned to the same antenna port with respect to the ePDCCHs for the PCell and the SCell of CIF=1. In other words, the antenna port allocated to DMRSs for the ePDCCHs to be transmitted in the search spaces for the PCell and the antenna port allocated to DMRSs for the ePDCCHs to be transmitted in the search spaces for the SCell are the same.

Further, as illustrated in FIG. 13, the search spaces CCEs of the PCell and the search spaces for the SCell of CIF=1 are configured in different CCEs (eREGs) within the same PRB pair (RB #1, RB #4, RB #7 and RB #10).

Next, the SCell of CIF=4 (equal to or greater than eREG division number 4) will be described. As illustrated in FIG. 13, at the time of configuring the search spaces for the SCell of CIF=4, configuration section 102 cyclically shifts eREG #0 in RB #1 configured as the search space for the PCell by the value of the CIF number (that is, 4 eREGs). However, since the CIF number (=4) is eREG size (eREG size=4) or greater, configuration section 102 configures the search space for the SCell of CIF=4 within RBG #2 adjacent to RB #1 in which the search space for the PCell is configured. In other words, configuration section 102 configures eREG #0 (CCE0) in RB #2 as the search space for the SCell of CIF=4. In the same manner, as illustrated in FIG. 13, configuration section 102 configures eREG #1 (CCE5) of RB #5 obtained by shifting eREG #1 in RB #4 configured as the search space for the PCell by 4 eREGs, as the search space for the SCell of CIF=4. The search spaces for the SCell with respect to other PRB pairs (RB #7 and RB #10) in which the search spaces for the PCell are configured as illustrated in FIG. 13 are obtained in a similar manner.

On the other hand, in the same manner as configuration section 102, configuration section 205 of terminal 200 specifies the search spaces for each CC configured for terminal 200. Specifically, first, configuration section 205 acquires information relating to PRB pairs and eREGs configured as the search spaces for the PCell from base station 100. Subsequently, configuration section 205 configures eREGs obtained by cyclically shifting the eREGs configured as the search spaces for the PCell within PRB pairs configured as the search spaces for the PCell, by the value of the CIF number configured in each SCell, as the search spaces for the SCell having the CIF number. In addition, when the CIF number is equal to or greater than the eREG size, configuration section 205 configures the search spaces for the SCell having the CIF number in eREGs within the PRB pairs adjacent to the PRB pairs configured as the search spaces for the PCell. For example, configuration section 205 configures the search spaces for the SCell, based on RBs and eREGs configured as the search spaces for the PCell and calculation equations (Equations 2 and 3) held in advance.

As described above, in the present embodiment, when communication is performed with terminal 200 using a plurality of CCs, base station 100 and terminal 200 configure the search spaces as candidates in which control information for the PCell is assigned and the search spaces as candidates in which control information for the SCell (CC other than the PCell) is assigned, in the same PRB pairs among a plurality of PRB pairs each of which is formed of a plurality of CCEs included in the PDSCH region in the PCell.

Thus, preferentially configuring the search spaces for the ePDCCHs of a plurality of CCs configured for terminal 200 in the same PRB pairs makes it possible to transmit DMRS using a less number of antenna ports (for example, see FIG. 12A). This enables an increase in transmission power of DMRS by power boosting for one terminal 200 and leads to an improvement in the channel estimation accuracy of the ePDCCHs.

Further, similar to Embodiment 1, since base station 100 and terminal 200 each configure the different eREGs in the same PRB pairs as the search spaces for the ePDCCHs of each CC, it is possible to reduce the blocking occurrence rate between the ePDCCHs of each CC.

According to the present embodiment, similar to Embodiment 1, at the time of configuring search spaces, the CIF number of each CC that is an existing parameter is used as a parameter for determining a cyclic shift value from the search spaces for the PCell. Thus, since there is no need to newly use a parameter for the search space configuration, it is possible to avoid increases in the number of bits necessary for configuring the search spaces.

Further, according to the present embodiment, in a case where the CIF number is the eREG division number (CCE division number) or greater, the search spaces for the SCell having the CIF number are shifted to eREGs within the PRB pairs adjacent to the PRB pairs in which the search spaces for the PCell are configured. Thus, similar to Embodiment 1, the search spaces for the SCell can be configured in resources which are expected to have relatively the same channel quality as the resources of the search spaces for the PCell. In this manner, the search spaces corresponding to a plurality of CCs configured for terminal 200 are configured in resources having the same degree of channel quality, so that an aggregation level, a transmission method (for example, presence or absence of transmission diversity), and the like to be selected for each CC can be matched between CCs, which in turn makes a scheduling process of base station 100 easier.

Figure 14:
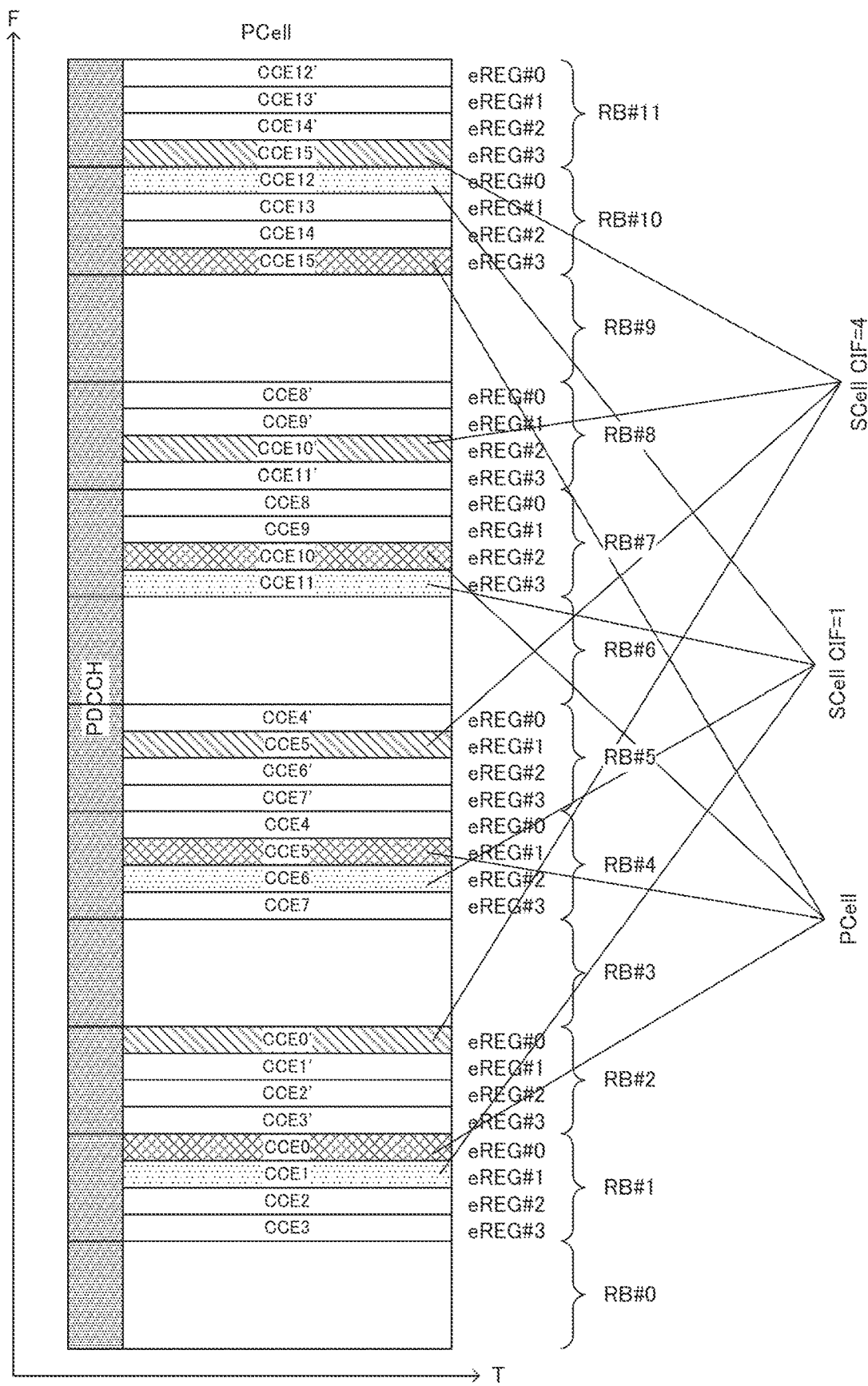
FIG. 14 is a diagram illustrating another search space configuration according to Embodiment 2 of the present disclosure.

In addition, in the present embodiment, as illustrated in FIG. 13, without changing CCE numbers (CCE0 to CCE15) corresponding to the search spaces for each CC, a correspondence between eREG number as well as RB number and CCE number is changed for each CC. However, as illustrated in FIG. 14, without changing the relationship between the CCE number and the eREG number, the search spaces for the SCell may be configured by cyclically shifting the CCE numbers of CCE in which the search spaces for the SCell are configured. In other words, in FIG. 13, the CCEs configured as the search spaces for each CC are CCE0, CCE5, CCE10, and CCE15 for any one of CCs. In contrast, in FIG. 14, the correspondence between eREG number and CCE number of each PRB pair (RB number) does not change, and the CCE numbers of the CCEs configured as the search spaces for each CC is different for each CC.

Embodiment 3

In Embodiment 3, a description will be given of a case of switching an operation of Embodiment 1 (search space configuration in units of PRB pairs) and operation of Embodiment 2 (search space configuration in units of CCEs). In addition, a base station and a terminal according to the present embodiment have a basic configuration common to base station 100 and terminal 200 according to Embodiment 1, so that the description will be given with references made to FIGS. 8 and 9.

Specifically, at the time of cross carrier scheduling, configuration section 102 of base station 100 determines whether a plurality of the ePDCCHs having the same aggregation level and the same allocation method (localized allocation or distributed allocation) among the ePDCCHs of a plurality of CCs configured for terminal 200 can be mapped, within one PRB pair of the PCell (without being overlapped). When it is determined that the plurality of ePDCCHs can be mapped, configuration section 102 applies the operation of Embodiment 2, and when it is determined that the plurality of ePDCCHs cannot be mapped, configuration section 102 applies the operation of Embodiment 1.

In other words, in a case where the search spaces for the PCell and the search spaces for the SCell can be configured in different CCEs (eREGs) within the same PRB pairs, similar to Embodiment 2, configuration section 102 configures different CCEs within the same PRB pairs among a plurality of PRB pairs included in PDSCH within the PCell, as the search spaces for the PCell and the search spaces for the SCell.

On the other hand, in a case where the search spaces for the PCell and the search spaces for the SCell cannot be configured in different CCEs (eREGs) within the same PRB pairs, similar to Embodiment 1, configuration section 102 configures different PRB pairs within the same RBGs among a plurality of RBGs included in the PDSCH region within the PCell, as the search spaces for the PCell and the search spaces for the SCell.

In other words, configuration section 102 switches a configuration unit of search spaces (allocation unit) between PRB pair (Embodiment 1) and CCE (Embodiment 2) according to the above determination result, and switches a range (allocation unit group) in which search spaces for each CC are preferentially configured, between RBG (Embodiment 1) and PRB pair (Embodiment 2).

Here, as an example of conditions of determining whether or not a plurality of the ePDCCHs having the same aggregation level and the same allocation method can be mapped within one PRB pair, Condition 1 (localized allocation) and Condition 2 (distributed allocation) will be described.

Condition 1: whether or not an aggregation level is equal to or less than half of a CCE division number per PRB pair in the localized allocation.

For example, in a case where the CCE division number per PRB pair is four, if the aggregation level is equal to or less than two (CCE division number per PRB pair÷2) (here, aggregation level is one or two), the plurality of ePDCCHs can be mapped within the same PRB pair. Accordingly, configuration section 102 applies the operation of Embodiment 2.

On the other hand, in a case where the CCE division number per PRB pair is four, if the aggregation level is equal to or greater than two (CCE division number per PRB pair÷2) (here, aggregation level is four), only one ePDCCH is mapped in a CCE within the same PRB pair, and the plurality of ePDCCHs cannot be mapped. Accordingly, configuration section 102 applies the operation of Embodiment 1.

Condition 2: whether or not the number of CCEs configured as the search space per PRB pair is equal to or less than a CCE division number per PRB pair in the distributed allocation.

For example, in a case where the CCE division number per PRB pair is four, if the number of CCEs configured as the search space for the ePDCCH per one PRB pair is equal to or less than two (CCE division number per one PRB pair÷2) in the distributed allocation, a plurality of the ePDCCHs can be mapped within the same PRB pair. Accordingly, configuration section 102 applies the operation of Embodiment 2.

On the other hand, when the division number of CCE per PRB pair is four, if the number of CCEs configured as the search space for the ePDCCH per PRB pair is greater than two in distributed allocation, a plurality of ePDCCHs cannot be mapped within the same PRB pair. Accordingly, configuration section 102 applies the operation of Embodiment 1.

In this manner, since configuration section 102 changeably applies the search space configuration method depending on Condition 1 or 2, resources to be configured as search spaces vary depending on the condition.

Figure 15:
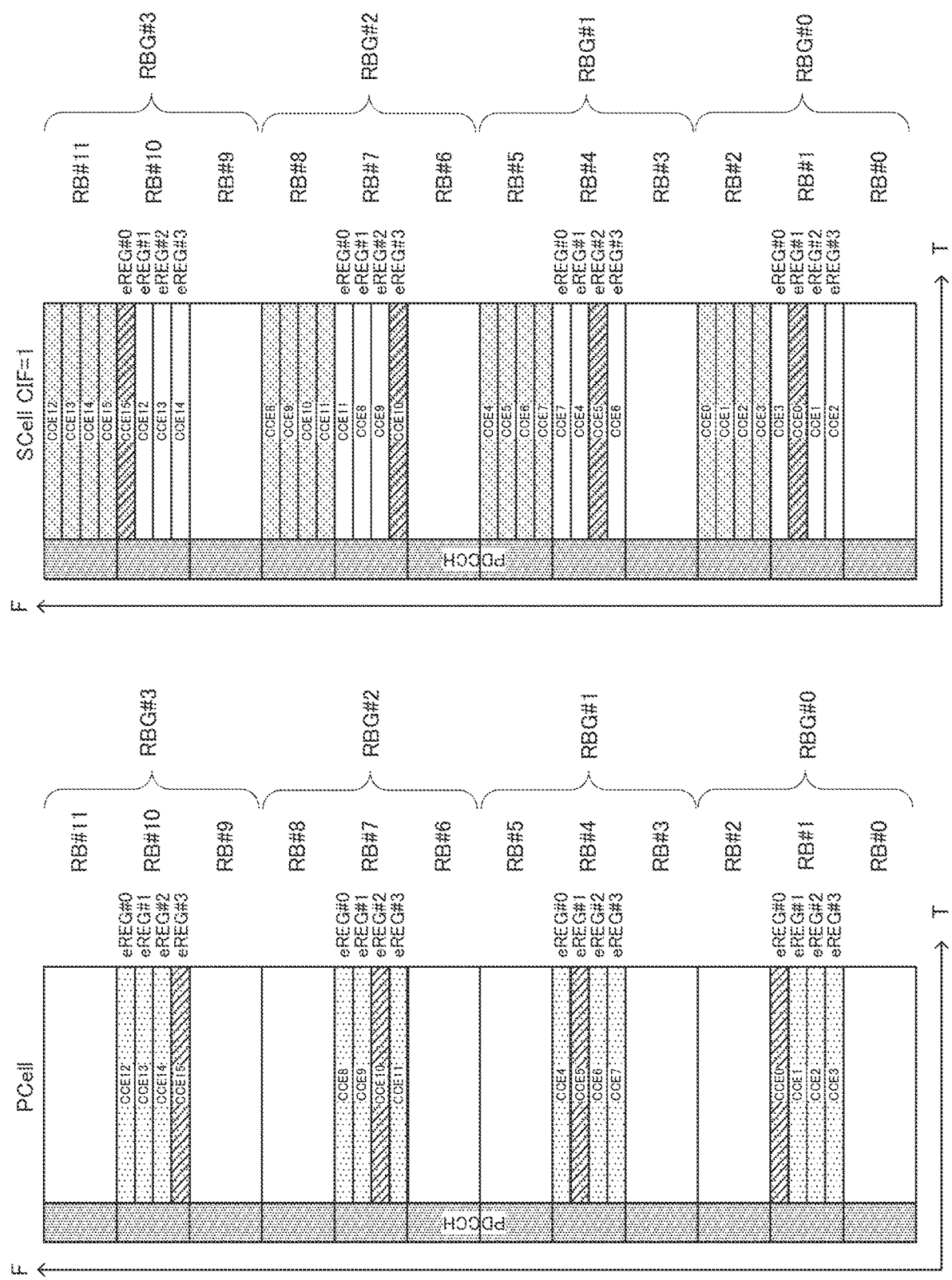
FIG. 15 is a diagram illustrating a search space configuration according to Embodiment 3 of the present disclosure.

FIG. 15 illustrates a configuration example of search spaces in a case where the operation of Embodiment 1 is applied, and a configuration example of search spaces in a case where an operation of Embodiment 2 is applied. In addition, both of the two drawings illustrated in FIG. 15 illustrate resources (that is, the same resources) to which signals transmitted in downlink of the PCell are mapped. For the convenience of explanation, FIG. 15 illustrates search spaces for two CCs configured within one CC (the PCell) separately for each of the CCs.

In FIG. 15, it is assumed that a CCE division number per PRB pair is four and an aggregation level is four. Further, in FIG. 15, with respect to the PCell, search spaces (four CCEs) for a localized allocation are configured to RB #1, RB #4, RB #7, and RB #10, respectively, while search spaces for a distributed allocation are configured to each one eREG (indicated by oblique lines) within RB #1, RB #4, RB #7, and RB #10. In addition, CIF number of the SCell is assumed to be 1 (CIF=1).

In other words, in FIG. 15, since the aggregation level (=four) is greater than two (CCE division number per PRB pair÷2) in localized allocation, configuration section 102 applies the operation of Embodiment 1 with respect to configuring the search spaces for localized allocation. In other words, configuration section 102 configures the PRB pairs obtained by cyclically shifting the PRB pairs of the PCell within the same RBGs as the PRB pairs configured as the search spaces for the PCell, by the value of the CIF number (CIF=1) configured in the SCell, as the search spaces for the SCell.

On the other hand, in FIG. 15, since the number of CCEs configured as the search space per PRB pair (=one CCE) is equal to or less than a resultant value (CCE division number÷2) in distributed allocation, configuration section 102 applies the operation of Embodiment 2 with respect to configuring the search space for distributed allocation. In other words, configuration section 102 configures the eREGs obtained by cyclically shifting the eREGs of the PCell within the same PRB pairs as the eREGs configured as the search spaces for the PCell, by the value of the CIF number (CIF=1) configured in the SCell, as the search spaces for the SCell.

In this manner, as illustrated in FIG. 15, the search spaces for the SCell of CIF=1 are configured in different RBs, for the localized allocation and distributed allocation.

In addition, configuration section 205 of terminal 200 performs the same process as the above described configuration section 102 in order to configure search spaces.

In this manner, in the present embodiment, base station 100 and terminal 200 switch between the operation of Embodiment 1 and the operation of Embodiment 2 depending on a condition whether the ePDCCHs of a plurality of CCs configured for terminal 200 can be mapped in one PRB pair (without being overlapped) in the search space configuration.

Thus, in a case where the ePDCCHs of a plurality of CCs can be mapped in one PRB pair without being overlapped, the search spaces for each CC are configured in CCEs (eREGs) different from each other in the same PRB pairs, so that it is possible to reduce the blocking occurrence rate between the ePDCCHs having the same aggregation level. In addition, as described in Embodiment 2, the search spaces for a plurality of CCs are configured in the same PRB pairs, so that it is possible to allocate the same antenna port, thereby increasing the transmission power of DMRS.

In addition, in a case where the ePDCCHs of a plurality of CCs cannot be mapped in one PRB pair without being overlapped, the search spaces for each CC are configured in PRB pairs different from each other in the same RBG, so that it is possible to reduce the blocking occurrence rate between the ePDCCHs having the same aggregation level.

Here, in a case where a plurality of CCs are configured for one terminal 200, control signals are transmitted using the same channel. Therefore, it is likely that the ePDCCHs are transmitted while the same aggregation level and the same transmission method (allocation method) are configured between DL grants or between UL grants. Accordingly, as the present embodiment, reducing the blocking occurrence rate between the ePDCCHs having the same aggregation level is effective in reducing the blocking rate in the system operation.

Embodiments of the present disclosure have been described thus far.

Other Embodiments

[1] In each of the abovementioned embodiments, a case where the search spaces for the SCell are configured by using search spaces for the PCell as a reference has been described. However, LTE-Advanced supports cross carrier scheduling from a certain SCell to another SCell. In this case, instead of parameters relating to the search spaces for the PCell used as the reference search spaces in the abovementioned embodiments, parameters relating to the search spaces for the SCell corresponding to the cross carrier scheduling source (CCs in which the search spaces for another CC are configured) may be used. Alternatively, similar to the abovementioned embodiments, since parameters relating to the PCell are applied without any change, the same search space configuration process as that of another SCell may be applied even to the SCell of the cross carrier scheduling source.

[2] In LTE-Advanced, applying different operations respectively to the downlink and uplink in a base station (also referred to as a transmission point/reception point) to which a terminal is connected has been studied, e.g., assigning downlink data (PDSCH) to the PCell and assigning uplink data (PUSCH) to the SCell. In these operations, it is important that, by applying cross carrier scheduling, a UL grant be transmitted from a certain CC (for example, the PCell) to cause uplink data to be transmitted from a different CC (for example, the SCell). By applying the abovementioned embodiments, it is possible to properly perform cross carrier scheduling using an ePDCCH even in these operations.

[3] The abovementioned embodiments are also applicable to the operation of CoMP (Coordinated Multi Point transmission and reception). CoMP is an operation to transmit or receive signals simultaneously in a plurality of base stations, or transmission/reception points (transmission points or reception points), or to instantly change the transmission points or the reception points. In other words, in the operation of CoMP, a plurality of base stations, or the transmission point or reception point may be treated like CCs (the PCell and SCell) described in the abovementioned embodiments. More specifically, each of CCs (the PCell and SCell) described in the abovementioned embodiments may be replaced by each base station (or a transmission point or reception point) in the operation of CoMP, and the same operations as the abovementioned embodiments are applied, thereby allowing search spaces to which a control signal intended for each base station is assigned to be configured. For example, the PCell in the abovementioned embodiments may be replaced by a band to be used by a first base station, and the SCell in the above respective embodiments may be replaced by a band to be used by a second base station different from the first base station. Thus, in the same frequency (frequency configured in one specific base station or a transmission point or reception point), it is possible to transmit a control signal intended for a plurality of base stations or the transmission points or reception points, in different search spaces. For example, in uplink, UL grant may be assigned to a band of a certain base station (base station having good reception quality. For example, macrocell), and uplink data (PUSCH) may be assigned to a band of a different base station (base station located in the vicinity of a terminal, e.g., pico-cell).

[4] As search spaces for DL grants, the search spaces may be configured for each DCI format for downlink to be determined according to a transmission mode. For example, LTE-Advanced requires that two search spaces be configured per CC for downlink search spaces. Base station 100 and terminal 200 may configure search spaces with respect to the two search spaces using the same method (for example, a method based on a cyclic shift pattern) as the abovementioned embodiments (see FIG. 16).

Note that DCI format 0 (for UL grant) and DCI format 1A (for DL grant) have the same size and can be subjected to blind decoding at the same time. Therefore, base station 100 may configure a search space for DCI format 4/DCI format 0/DCI format 1A as a search space for UL grant, and configure a search space for a DCI format for DL grant that is dependent on the transmission mode as a search space for DL grant.

In addition, since DCI format 1A is used when communication cannot be performed using a DCI format with a large number of bits such as a DCI format for DL that is determined according to the transmission mode and the like, the usage frequency of DCI format 1A is low. Accordingly, a search space for DCI format 1A is configured to the same search space as a UL grant (DCI format 0), and there is no significant problem even if a UL grant and a DL assignment cannot be transmitted at the same time using the same PRB pair. Furthermore, whether or not DCI format 4 is used varies depending on the transmission mode of the UL, and hence terminal 200 may be configured to perform blind decoding only when DCI format 4 is used.

Figure 16:
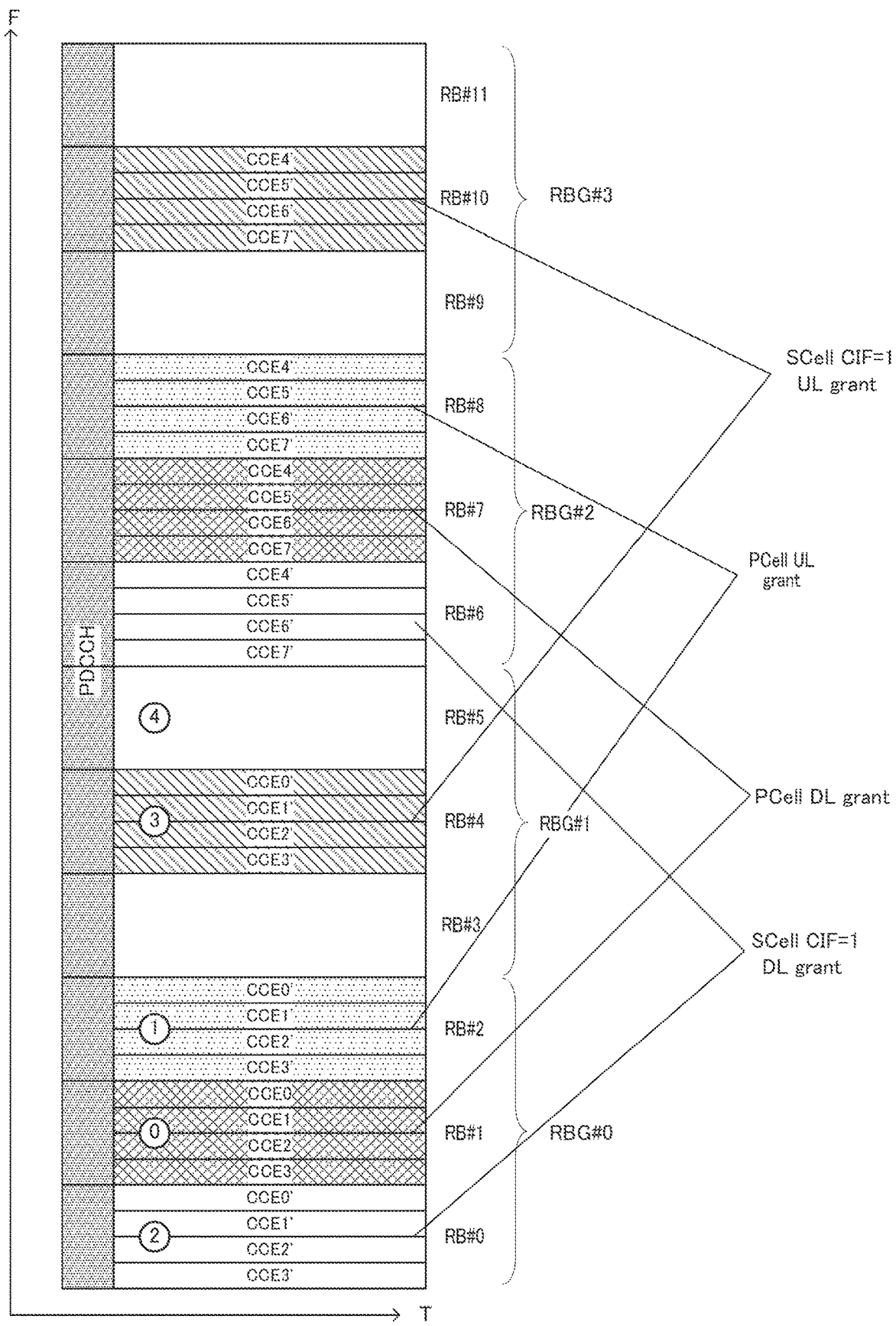
FIG. 16 is a diagram illustrating a search space configuration according to a variation of the present disclosure.

As described above, when a predetermined number of search spaces per CC is configured and cross carrier scheduling is also performed, in Equation 1 or Equations 2 and 3, $n_{CL}$ is substituted with $n_{CL}^*$(predetermined number), and thus the same operation as the abovementioned embodiments can be performed. For example, as illustrated in FIG. 16, when base station 100 and terminal 200 configure two search spaces (search space for DL grant and search space for UL grant) per CC and perform cross carrier scheduling, the same operation can be performed by substituting $n_{CL}$ with $n_{CL}*2$ in Equation 1 or Equations 2 and 3. In other words, when a predetermined number (in FIG. 16, two) of different search spaces are configured for each format of control information in each of the PCell and the SCell, base station 100 and terminal 200 configure PRB pairs obtained by cyclically shifting PRB pairs configured as the search spaces for the PCell within the same RBG, by the value of the CIF number (in FIG. 16, CIF=1) multiplied by a predetermined number (in FIG. 16, 2=(1*2)), as the search spaces for the SCell.

[5] Although CCEs are described as the division units of PRB pairs in the abovementioned embodiments, units obtained by further dividing the CCE may be regarded as the division units of PRB pairs, and the abovementioned embodiments may be applied with respect to the division units. For example, units obtained by further dividing the CCE may be defined as eREGs (or, also simply referred to as "REG"), and the abovementioned embodiments may be applied with respect to the eREGs. For example, base station 100 and terminal 200 may configure different eREGs within the same CCE among a plurality of CCEs included in a PDSCH region within the PCell, as the search spaces for the PCell and the search spaces for the SCell.

[6] In addition, the value used as the parameter for determining the amount of cyclic shift in the abovementioned embodiments is not limited to the CIF number, and instead, other identification numbers shared between base station 100 and terminal 200 may be used as the parameter.

[7] The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

[8] In the foregoing embodiments, the present disclosure is configured with hardware by way of example, but the disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A transmission apparatus according to this disclosure includes: a configuration section that configures, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and a transmission section that transmits control information mapped to the first search space and control information mapped to the second search space.

In the transmission apparatus according to this disclosure, the configuration section configures different allocation units within the same group of allocation units as the first search space and the second search space, respectively.

In the transmission apparatus according to this disclosure: the allocation units are each a physical resource block (PRB) pair, and the groups of allocation units are each a resource block group (RBG) or a sub-band; and the configuration section configures different PRB pairs within a same RBG or within the same sub-band among a plurality of RBGs as the first search space and the second search space, respectively, the plurality of RBGs being included in the data-assignable region within the first CC.

In the transmission apparatus according to this disclosure, the configuration section configures, within the same RBG or within the same sub-band where the PRB pairs are referred to as a first PRB pair and a second PRB pair, the second PRB pair as the second search space, the second PRB pair being different from the first PRB pair and being obtained by cyclically shifting the first PRB pair configured as the first search space.

In the transmission apparatus according to this disclosure, a value used in the cyclic shift is a carrier indication field (CIF) value configured for the second CC.

In the transmission apparatus according to this disclosure, when a value used in the cyclic shift is equal to or greater than a number of PRB pairs forming the RBG, the configuration section configures, as the second search space, a third PRB pair within another RBG adjacent to the RBG to which the first PRB pair belongs.

In the transmission apparatus according to this disclosure, the configuration section configures, as the second search space, the second PRB pair obtained by cyclically shifting the first PRB pair within the same sub-band in preference to the same RBG.

In the transmission apparatus according to this disclosure, when a plurality of precoding resource block groups (PRGs) which are PRB bundling units are included in the same RBG, the configuration section preferentially configures, as the second search space, a PRB pair within a PRG including the first PRB pair among the plurality of PRGs.

In the transmission apparatus according to this disclosure: when a number of PRB pairs forming the RBG is four, a number of PRB pairs forming the PRG is two; and the configuration section configures one of the PRB pairs forming the same PRG, as the first search space, and the other one of the PRB pairs as the second search space.

In the transmission apparatus according to this disclosure: the allocation units are each a control channel element (CCE), and the groups of allocation units are each a physical resource block (PRB) pair, and the configuration section configures different CCEs within a same PRB pair among a plurality of PRB pairs as the first search space and the second search space, respectively, the plurality of PRB pairs being included in a data-assignable region within the first CC.

In the transmission apparatus according to this disclosure, the configuration section configures, within the same PRB pair where the CCEs are referred to as a first CCE and a second CCE, the second CCE as the second search space, the second CCE being different from the first CCE and being obtained by cyclically shifting the first CCE configured as the first search space.

In the transmission apparatus according to this disclosure, a value used in the cyclic shift is a carrier indication field (CIF) value configured for the second CC.

In the transmission apparatus according to this disclosure, when a value used in the cyclic shift is equal to or greater than a number of CCEs forming the PRB pair, the configuration section configures, as the second search space, a third CCE within another PRB pair adjacent to the PRB pair to which the first CCE belongs.

In the transmission apparatus according to this disclosure, an antenna port allocated to a reference signal for control information to be transmitted in the first search space and an antenna port allocated to a reference signal for control information to be transmitted in the second search space are the same.

In the transmission apparatus according to this disclosure, when the first search space and the second search space cannot be configured in different CCEs, respectively, within the same PRB pair, the configuration section sets each of the allocation units to be a physical resource block (PRB) pair, and each of the groups of allocation units to be a resource block group (RBG) or a sub-band, and configures different PRB pairs within a same RBG or within a same sub-band among a plurality of RBGs as the first search space and the second search space, respectively, the plurality of RBGs being included in a data-assignable region within the first CC.

In the transmission apparatus according to this disclosure, when an aggregation level in localized allocation is greater than half of a number of CCEs forming one PRB pair, the configuration section determines that the first search space and the second search space cannot be configured in different CCEs, respectively, within the same PRB pair.

In the transmission apparatus according to this disclosure, when a number of CCEs configured as a search space per PRB pair is greater than half of the number of CCEs forming one PRB pair in distributed allocation, the configuration section determines that the first search space and the second search space cannot be configured in different CCEs, respectively, within the same PRB pair.

In the transmission apparatus according to this disclosure, the first CC is a primary cell and the second CC is a secondary cell.

In the transmission apparatus according to this disclosure, the first CC is a band used by a first base station, and the second CC is a band used by a second base station different from the first base station.

In the transmission apparatus according to this disclosure, when a predetermined number of different search spaces are configured for each format of control information in each of the first CC and the second CC, the configuration section configures, within the same RBG or within the same sub-band, the second PRB pair as the second search space, the second PRB pair being obtained by cyclically shifting the first PRB pair configured as the first search space, by a value obtained by multiplying the CIF value by the predetermined number.

In the transmission apparatus according to this disclosure, wherein: the allocation units are each a resource element group (REG), and the groups of allocation units are each a control channel element (CCE); and the configuration section configures different REGs within a same CCE among a plurality of CCEs as the first search space and the second search space, respectively, the plurality of CCEs being included in a data-assignable region within the first CC.

A reception apparatus according to this disclosure includes: a configuration section that configures, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and a reception section that receives control information mapped to the first search space and control information mapped to the second search space.

A transmission method according to this disclosure includes: configuring, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and transmitting control information mapped to the first search space and control information mapped to the second search space.

A reception method according to this disclosure includes: configuring, when communication is performed using a plurality of component carriers (CCs), a first search space and a second search space within a same group of allocation units among a plurality of groups of allocation units included in a data-assignable region within a first CC, the first search space being a candidate to which control information for the first CC is assigned, the second search space being a candidate to which control information for a second CC other than the first CC among the plurality of CCs is assigned; and receiving control information mapped to the first search space and control information mapped to the second search space.

The disclosure of Japanese Patent Application No. 2012-107677, filed on May 9, 2012, including the specification, drawings and abstract are incorporated herein by reference in its entirety.

INDUSTRIAL APPLICABILITY

The present disclosure is useful in that cross carrier scheduling can be properly performed in ePDCCHs.

REFERENCE SIGNS LIST

100 Base station
200 Terminal
101 Assignment information generation section
102, 205 Configuration section
103, 207 Error correction coding section
104, 208 Modulation section
105, 209 Signal assignment section
106, 210 Transmission section
107, 201 Reception section
108, 203 Demodulation section
109, 204 Error correction decoding section
202 Signal separating section
206 Control signal reception section

The invention claimed is:

1. A communication system comprising:
a user equipment comprising:
control circuitry, which, in operation, determines a first search space of mapping candidates and a second search space of mapping candidates in a physical resource block set (PRB set) in a data region of a first component carrier, wherein the second search space is configured by shifting control channel elements (CCEs) of the mapping candidates of the first search space by a Carrier Indicator Field value (CIF value) of a second component carrier; and
a detector, which, in operation, detects downlink control information for the first component carrier by decoding the first search space and, in operation, detects downlink control information for the second component carrier by decoding the second search space; and
a base station comprising:
a processor, which, in operation, configures the first search space of mapping candidates and the second search space of mapping candidates in the PRB set in the data region of the first component carrier; and
a transmitter, which, in operation, transmits the downlink control information for the first component carrier in mapping candidates of the first search space and transmits the downlink control information for the second component carrier in mapping candidates of the second search space.

2. The communication system according to claim 1, wherein
the PRB set includes a plurality of CCEs.

3. The communication system according to claim 1, wherein each of the mapping candidates of the first search space and each of the mapping candidates of the second search space is an Enhanced Physical Downlink Control Channel (EPDCCH) candidate in the data region.

4. The communication system according to claim 1, wherein
the data region comprises a plurality of PRB sets and each of the plurality of PRB sets includes a plurality of CCEs, each CCE including a plurality of resource element groups (REGs); and
a correspondence relationship between CCE numbers and REG numbers in the second search space matches a correspondence relationship between CCE numbers and REG numbers in the first search space.

5. The communication system according to claim 1, wherein the first search space and the second search space are configured in a non-overlapping manner in the PRB set.

6. The communication system according to claim 1, wherein the first component carrier is a primary cell and the second component carrier is a secondary cell.

7. A communication method comprising:
a base station configuring a first search space of mapping candidates and a second search space of mapping candidates in a physical resource block set (PRB set) in a data region of a first component carrier, wherein the second search space is configured by shifting control channel elements (CCEs) of the mapping candidates of the first search space by a Carrier Indicator Field value (CIF value) of a second component carrier;
the user equipment determining the first search space of mapping candidates and the second search space of mapping candidates in the PRB set in the data region of the first component carrier;
the base station transmitting downlink control information for the first component carrier in mapping candidates of the first search space and downlink control information for the second component carrier in mapping candidates of the second search space; and
the user equipment detecting the downlink control information for the first component carrier by decoding the first search space and detecting the downlink control information for the second component carrier by decoding the second search space.

8. The communication method according to claim 7, wherein
the PRB set includes a plurality of CCEs.

9. The communication method according to claim 7, wherein each of the mapping candidates of the first search space and each of the mapping candidates of the second search space is an Enhanced Physical Downlink Control Channel (EPDCCH) candidate in the data region.

10. The communication method according to claim 7, wherein
the data region comprises a plurality of PRB sets and each of the plurality of PRB sets includes a plurality of CCEs, each CCE including a plurality of resource element groups (REGs); and
a correspondence relationship between CCE numbers and REG numbers in the second search space matches a correspondence relationship between CCE numbers and REG numbers in the first search space.

11. The communication method according to claim 8, wherein the first search space and the second search space are configured in a non-overlapping manner in the PRB set.

12. The communication method according to claim 7, wherein the first component carrier is a primary cell and the second component carrier is a secondary cell.

\* \* \* \* \*